(12) United States Patent
Alao et al.

(10) Patent No.: US 7,490,346 B2
(45) Date of Patent: Feb. 10, 2009

(54) DIGITAL TELEVISION APPLICATION PROTOCOL FOR INTERACTIVE TELEVISION

(75) Inventors: Rachad Alao, Sunnyvale, CA (US); Matthew Huntington, Twickenham (GB); Waiman Lam, Union City, CA (US); Alain Delpuch, Paris la Defense cedex (FR); Jose Henrard, Paris (FR); Vincent Dureau, Palo Alto, CA (US)

(73) Assignee: OpenTV, Inc., San Francisco, CA (US)

( * ) Notice: Subject to any disclaimer, the term of this patent is extended or adjusted under 35 U.S.C. 154(b) by 1613 days.

(21) Appl. No.: 10/061,769

(22) Filed: Feb. 1, 2002

(65) Prior Publication Data

US 2002/0169885 A1 Nov. 14, 2002

Related U.S. Application Data

(63) Continuation-in-part of application No. 09/858,379, filed on May 16, 2001, now Pat. No. 7,017,175.

(60) Provisional application No. 60/279,543, filed on Mar. 28, 2001, provisional application No. 60/269,261, filed on Feb. 15, 2001, provisional application No. 60/267,876, filed on Feb. 9, 2001, provisional application No. 60/266,210, filed on Feb. 2, 2001, provisional application No. 60/265,986, filed on Feb. 2, 2001.

(51) Int. Cl.
  *G06F 15/16* (2006.01)
(52) U.S. Cl. .................. 725/151; 709/203; 725/118; 725/119
(58) Field of Classification Search ............... 725/118, 725/199, 151; 709/230, 203
  See application file for complete search history.

(56) References Cited

U.S. PATENT DOCUMENTS 5,432,937 A 7/1995 Tevanian et al.

(Continued)

FOREIGN PATENT DOCUMENTS

EP 0811939 12/1997

(Continued)

OTHER PUBLICATIONS

International Search Report, PCT/US 02/ 02829, Jan. 2, 2002.

(Continued)

*Primary Examiner*—Christopher Kelley
*Assistant Examiner*—Timothy R Newlin
(74) *Attorney, Agent, or Firm*—Meyertons Hood Kivlin Kowert & Goetzel, P.C.; Rory D. Rankin

(57) ABSTRACT

A common communication language that can address all the applications running in a multitude of set top boxes (STBs) or client devices and application servers. The present invention, DATP protocol encapsulates a Meta language that provides a generic portable communication application programmer interface that requires light processor utilization and is well suited for a typical STB possessing limited processing power. DATP requires relatively few processing cycles compared to typical Internet communication protocols. DATP reduces the overhead of the communication protocol handler at the STB and makes the communication protocol handler common for all STBs applications. The preferred DATP protocol is portable for all STBs since it is written in a native language that interfaces with the underlying operating system of the STB. A SGW (SGW) performs as a DATP server. The SGW translates between DATP messages and standard communication protocols. SGW enables SP clients at STBs utilizing DATP to communicate with service applications using a variety of communication protocols. A content converter is provided to convert standard Web content into content suitable for display on a client-viewing device, e.g., a TV.

120 Claims, 15 Drawing Sheets

U.S. PATENT DOCUMENTS

| | | | |
|---|---|---|---|
| 5,668,810 | A | 9/1997 | Cannella, Jr. |
| 5,848,070 | A | 12/1998 | Durvaux et al. |
| 5,928,331 | A | 7/1999 | Bushmitch |
| 5,987,518 | A | 11/1999 | Gotwald |
| 6,141,793 | A | 10/2000 | Bryant et al. |
| 6,188,401 | B1 | 2/2001 | Peyer |
| 6,192,082 | B1 | 2/2001 | Moriarty et al. |
| 6,201,538 | B1 | 3/2001 | Wugofski |
| 6,226,642 | B1 | 5/2001 | Beranek et al. |
| 6,311,197 | B2 | 10/2001 | Mighdoll et al. |
| 6,405,367 | B1 | 6/2002 | Bryant et al. |
| 6,558,431 | B1 | 5/2003 | Lynch et al. |
| 6,593,944 | B1 | 7/2003 | Nicolas et al. |
| 6,659,860 | B1 | 12/2003 | Yamamoto et al. |
| 7,017,175 | B2 * | 3/2006 | Alao et al. ............ 725/105 |
| 2002/0026645 | A1 * | 2/2002 | Son et al. ............... 725/117 |
| 2003/0093799 | A1 * | 5/2003 | Kauffman et al. ......... 725/86 |

FOREIGN PATENT DOCUMENTS

| | | | |
|---|---|---|---|
| EP | 1202188 | | 10/2001 |
| EP | 1170675 | | 1/2002 |
| GB | 2346238 | | 8/2000 |
| WO | PCT/US99/21983 | | 9/1999 |
| WO | WO 00/24192 | * | 4/2000 |
| WO | WO 00/39666 | | 7/2000 |
| WO | WO 00/69140 | | 11/2000 |
| WO | WO 01/03011 | | 1/2001 |
| WO | WO 01/06784 A2 | | 1/2001 |

OTHER PUBLICATIONS

International Search Report, PCT/US 02/02663, Apr. 11, 2003.

Japanese Patent Application Laid-Open No. Hei 11-239134 with English Abstract.

Notice of the Reason for Refusal mailed Jun. 5, 2007, Patent Application No. 2002-563679.

Japanese Patent Application Laid-Open No. Hei 10-254807; Application No, Hei 10-10779; Published Sep. 25, 1998, Lucent Technology Inc., Method for Reading Server Site Anonymously.

Japanese Patent Application Laid-Open No. 2000-163367; Application No. 11-261089; Published Sep. 14, 1999, Fon Dot Com Japan KK, Method and Architecture (System) for Interactive Bidirectional Communication Device to Interact with Network.

Japanese Patent Application Laid-Open No. 2000-354059; Application No. Hei 11-165826; Published Jun. 11, 1999, Hatoyama Takashi, Information Data Transmitting-Receiving System and Information Data Transfer Equipment.

Notice of the Reason for Refusal; Patent Application No. 2002-563679; Mailed from PTO on Aug. 19, 2008.

* cited by examiner

REJECTION LIST

DIGITAL TELEVISION APPLICATION PROTOCOL FOR INTERACTIVE TELEVISION

CROSS REFERENCE TO RELATED APPLICATIONS

This application is a continuation in part of the USPTO patent application entitled "Digital Television Application Protocol for Interactive Television" filed on May 16, 2001, Ser. No. 09/858,379 now U.S. Pat. No. 7,017,175. This application claims priority from the USPTO provisional patent application entitled "A System for Adaptive Control of Access, Content and Scheduling For Interactive Television" filed on Feb. 2, 2001, Ser. No. 60/265,986 which is hereby incorporated herein by reference; USPTO provisional patent application entitled "A System for Adaptive Control of Access, Content and Scheduling For Interactive Television" filed on Feb. 2, 2001, Ser. No. 60/266,210 which is hereby incorporated herein by reference; USPTO provisional patent application entitled "A System for Adaptive Control of Access, Content and Scheduling For Interactive Television" filed on Feb. 9, 2001, Ser. No. 60/267,876 which is hereby incorporated herein by reference; and USPTO provisional patent application entitled "A System for Adaptive Control of Access, Content and Scheduling For Interactive Television" filed on Feb. 15, 2001, Ser. No. 60/269,261 which is hereby incorporated herein by reference; USPTO provisional patent application entitled "A System for Adaptive Control of Access, Content and Scheduling For Interactive Television" filed on Mar. 28, 2001, Ser. No. 60/279,543 which is hereby incorporated herein by reference. This application is also related to USPTO patent application entitled "A Service Gateway for Interactive Television" filed on Feb. 1, 2002.

COPYRIGHT NOTICE

A portion of the disclosure of this patent document contains material (code listings and message listings) to which the claim of copyright protection is made. The copyright owner has no objection to the facsimile reproduction by any person of the patent document or the patent disclosure, as it appears in the U.S. Patent and Trademark Office file or records, but reserves all other rights whatsoever. Copyright 2001 OpenTV, Inc.

BACKGROUND OF THE INVENTION

1. Field of the Invention

The present invention relates to the field of communications in the interactive television environment and specifically relates to a method and apparatus for providing a generic Meta language and digital television application protocol for interactive television.

2. Summary of the Related Art

Interactive television systems can be used to provide a wide variety of services to viewers. Interactive television systems are capable of delivering typical video program streams, interactive television applications, text and graphic images, web pages and other types of information. Interactive television systems are also capable of registering viewer actions or responses and can be used for such purposes as marketing, entertainment and education. Users or viewers may interact with the systems by ordering advertised products or services, competing against contestants in a game show, requesting specialized information regarding particular programs, or navigating through pages of information.

Typically, a broadcast service provider or network operator generates an interactive television signal for transmission to a viewer's television. The interactive television signal may include an interactive portion comprising of application code or control information, as well as an audio/video portion comprising a television program or other informational displays. The broadcast service provider combines the audio/video (A/V) and interactive portions into a single signal for transmission to a receiver connected to the user's television. The signal is generally compressed prior to transmission and transmitted through typical broadcast channels, such as cable television (CATV) lines or direct satellite transmission systems.

Typically, the interactive functionality of the television is controlled by a set top box (STB) connected to the television. The STB receives a broadcast signal transmitted by the broadcast service provider, separates the interactive portion of the signal from the A/V portion of the signal and decompresses the respective portions of the signal. The STB uses the interactive information, for example, to execute an application while the A/V information is transmitted to the television. The STB may combine the A/V information with interactive graphics or audio generated by the interactive application prior to transmitting the information to the television. The interactive graphics and audio may present additional information to the viewer or may prompt the viewer for input. The STB may provide viewer input or other information to the broadcast service provider via a modem connection or cable.

In accordance with their aggregate nature, interactive television systems provide content in various content forms and communication protocols the must be understood and displayed by the STB/client that receives the information from the broadcast service provider/network operator. Typically the client is a STB having a processor possessing limited processing power. Translation of the various contents and protocols is beyond the limited processing capability available in the typical STB processor. Thus there is a need for a simple communication protocol which can be easily understood by the client/STB processor and communicate in the various protocols used by service providers.

SUMMARY OF THE INVENTION

The present invention addresses the needs of the interactive television environment discussed above. The present invention satisfies a long felt need to provide a simple content and communication protocol than can be easily handled by a STB processor and enables complex communication with the SP and service providers. While the following discussion uses the example of a client/STB, the present invention applies to all client devices including digital assistants, cell phones, pocket personal computers or any other types of electronic device capable of receiving an electronic signal. The present invention resides in a service platform (SP) or server. The SP enables a network operator, who provides television signals to its subscriber clients, to create and provide business, transport and communication functions that enable communication between service providers and the client or STB viewer.

The interactive television environment must deal with and solve problems that are unique to interactive television, such as the intermittent return path from the client to the SP. That is, the client device is not always connected to the communication link as when the STB is turned off. Thus, there is not always an active return path from the client. The present invention provides a store and forward function to alleviate this intermittent return path problem.

Bandwidth and processing limitations and communication complexities are also problematic in the interactive television environment. On one hand the network operator typically provides a broadcast channel with a relatively large data transmission capacity (typically a satellite and dish) to send data and programming to the client. On the other hand, the client return path has a relatively low data transmission capacity, usually in the STB scenario; a telephone line is the return path. Even if the return path happens to have a larger bandwidth, STBs/clients typically possess a low speed modem to send data up the return path. These and other issues are addressed by the present invention.

BRIEF DESCRIPTION OF THE DRAWINGS

Other objects and advantages of the invention will become apparent upon reading the following detailed description and upon reference to the accompanying drawings in which.

Figure 1:
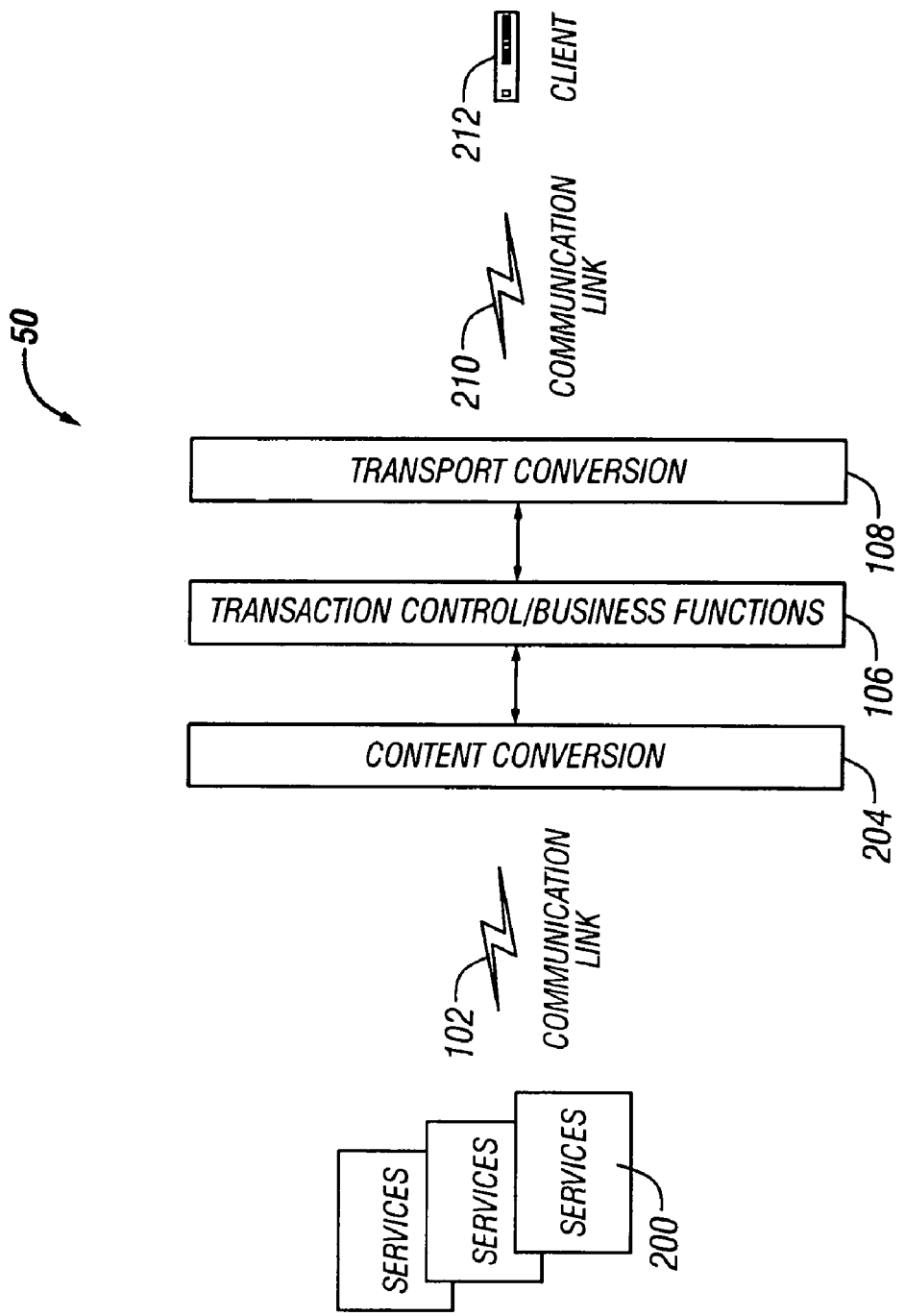
FIG. 1 illustrates a high-level architecture diagram for a preferred embodiment of a service platform in which the present invention resides.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION OF A PREFERRED EMBODIMENT

Overview

The present invention, a digital television application protocol DAP/DATP resides in service platform (SP) and interacts with the content transcsoder, H2O and a service gateway (SGW). In a typical interactive television environment, there are a multitude of clients, typically STBs that must communicate with a multitude of application servers providing content over a multitude of networks using various communication protocols. Typically the STB has limited processing power so that it is undesirable to place a multitude of communication protocol handlers in the STB processor or STB stack. Thus, there is a need for a common communication interface that can address all the STBs and application servers. The present invention, DATP protocol provides a generic portable communication application programmer interface (API) that requires light processor utilization, well suited for a typical STB possessing limited processing power. DATP requires relatively few processing cycles compared to typical Internet communication protocols. DATP reduces the overhead of the communication protocol handler at the STB and makes the communication protocol handler common for all STBs. The preferred DATP protocol is portable for all STBs since it is written in O-code, a STB independent byte code that interfaces with the operating system of the STB.

In the present invention, a SGW performs as a DATP server. SGW enables SP clients at STBs to connect to application servers using DATP protocol. An HTML to native code proxy, H2O is provided that can be considered in this context as an SP application server. H2O performs specific content translation, such as HTML to SP O-codes. O-codes are the STB independent bytecode of the virtual machine running on the SP. In a preferred embodiment, an O-code implementation of the DATP protocol stack exists in the client, typically a STB. The client communicates using DATP protocol to a DATP server, SGW. The H2O proxy exists on the other side of the SGW performing content translation such as HTML to O-code. An O-code implementation of a DATP stack in the client/STB issues communication requests and communicates with SGW using DATP protocol. Content translated by H2O is passed through the SGW to the client where content is displayed.

SGW is a DATP server, which creates execution threads to handle each individual STB and process each related content. The SGW server stack communicates with the client/STB using DATP protocol. SGW also applies the appropriate protocol needed to enable the STB to communicate back and forth between the STB and different application servers. Interactive television applications typically utilize well-known Internet based protocols (HTML, etc.) to communicate back and forth between the client/STB and application servers. The present invention provides a generic and well-suited asymmetrical communication protocol between the client/STB and application servers via the SGW. The present invention accommodates the minimal processing and memory available at the client/STB.

The present invention provides an asymmetrical solution to data compression. The bandwidth of the bi-directional path from the client/STB to the network operator is relatively small, typically a regular telephone line or a return channel in a cable and usually connected to a low speed modem. Thus, to increase the bandwidth available over the low speed modem, the content down loaded from the server to the client/STB is compressed. At the client/STB, however, data compression is preferably not performed. The client/STB data returned is relatively small and not in need of data compression by the STB processor which typically does not have the processing power to perform data compression. In an alternative embodiment, there are, however, instances where data compression from the client/STB is desired and in this case data compression is performed at the SGW. Data compression, with respect to the client/STB is asymmetric in that data is compressed going down stream to the client/STB and is not compressed coming upstream from the STB. Thus, the architecture of the present invention is asymmetric, unlike typical Internet-based protocols where both entities communicating are assumed to be symmetrically powered.

The SGW and client/STB communicate with application servers utilizing session identifiers for clients rather than user identifiers so that the client users remain anonymous. The present invention also provides multicasting to clients. A multicast message can be sent to multiple clients via a broadcast link, when broadcast bandwidth and a tuner is in the STB and broadcast messages are available and sensed by a particular filter setup in the STB. In this case DATP requests that the STB receives a message from a specific entry on the broadcast. If no tuner is available to receive the broadcast in the STB, message fragments are also sent on each point-to-point individual link to the STBs without a tuner. If the STBs are on a LAN, messages are sent to a well-known address on the LAN to the STBs.

The present invention also provides a novel structure and method for handling cookies from Internet applications and provides a "light" HTTP protocol, LHTTP, which encapsulates HTTP requests within DATP messages. LHTTP is a simplified version of HTTP that runs on top of DATP. The novel LHTTP runs on top of DATP and does not implement any part of the TCP/IP specification.

SGW establishes a link or a socket connection with a STB. To implement User Datagram Protocol (UDP), however, UDP is not performed directly. For a STB that can output UDP, the present invention encapsulates DATP on top of UDP. The DATP-encapsulated UDP is sent to the SGW. In the case of UDP, a socket in the SGW and a socket in the STB are effectively bound together in a simulated connection on top of UDP. Through this simulated connection, DATP packets are sent from the STB to the SGW server and from the SGW server to the STB.

Many STB modems do not provide data compression, possess minimal processing capability and cannot afford the processing cost to perform data compression in the STB. Thus in a preferred embodiment, asymmetrical data compression is performed at the STB. STB receives compressed data and decompresses it, however, the STB does not perform data compression. Data decompression, however, is less compute intensive than data compression, thus, the STB preferably performs decompression. The STB does not perform data compression. Compressed data is sent to the DATP stack at the STB but uncompressed data is sent from the STB to the SGW. SGW performs data compression on the uncompressed data sent from the STB and SGW returns the compressed data to application servers. Thus, the preferred DATP/SGW asymmetric compression increases the bandwidth of the return path from the STB through the SGW to the application servers.

The present invention provides asymmetrical routing by SGW. In asymmetrical routing a portion of the bandwidth is allocated to SGW to send data to the broadcast stream for broadcast. SGW has the ability to decide whether to send data to one or more STBs over the broadcast stream or a point-to-point (PTP) connection between the SGW and the STB(s). SGW routes data via broadcast or PTP, based on the amount of data, the speed of the point to point link to the STB(s) and the current communication links loading conditions. Thus SGW may decide not to send a data set over the point-to-point link because the data set is too large and instead send it over the broadcast stream. The data can be compressed by SGW before sending it to the recipient stream or point-to-point link to increase the bandwidth of the link between SGW and the link or stream and to accommodate memory limitations in the STB.

DATP is computationally lightweight because it is designed so that all STB stack operations require a minimum of processing power. For example, in the DATP encryption scheme, when using Rivest, Shamir and Alderman (RSA) public key encryption, the key that comes from the server is chosen so that the its exponent is small (3 or greater) so that exponentiation phase takes a minimal amount of time and processing power. Thus the heavy computation is reserved for the SGW server and the STB or client processor requires minimum processing capability. Likewise the LHTTP layer on top of DATP in the STB does not have to perform any heavy parsing or other processing intensive operations. Instead, HTTP data is encapsulated in DATP messages by LHTTP and the HTTP compute intensive functions, such as conversion to HTTP protocol are handled by SGW.

DATP performs more than transactions. Rather, DATP is a message-based protocol rather than a transaction oriented protocol, thus, when a user sends a message from a STB to an application server, the application server does not have to respond. That is, there is not a one-to-one correspondence between STB and service provider messages. All DATP messages except the class of unreliable DATP messages is processed through a DATP reliably layer. All DATP messages have unique identifiers, which can be used as the basis of a transaction.

In a transaction using DATP, for example a HTTP request, the STB sends a DATP message to SGW requesting a Web page. SGW converts LHTTP to HTTP and sends it to the Internet via H2O. Once the response containing the Web page returns from the Internet to SGW via H2O, which converts the content, SGW sends a LHTTP DATP message to the STB returning the content of the requested Web page to the STB. Another example of a transaction is a Fetchmail request sent from a STB. The Fetchmail request is encapsulated in a DATP message. DAML is used on top of the DATP message. DAML is a domain specific instance of XML.

Thus, the STB sends a DATP message to Fetchmail containing a DAML (XML) request. Fetchmail reads the DATP message and extracts the content from the message, passes the content to the application server, which processes the transaction and returns a message to Fetchmail. Fetchmail then sends a DATP message containing requested content to the STB.

DATP is flexible because of its mapping onto the Open Systems Interconnection (OSI) model. The OSI model comprises seven layers for computer-to-computer communication. Each of the seven layers builds on the layer below it. The seven OSI layers are, from bottom to top, as follows: physical, data link, network, transport, session, presentation and application layers. DATP is flexible as it spans four of the seven layers of the OSI model. DATP spans the data link, network, transport and session layers of the OSI model. The OSI model assumes symmetrical processing capability at each computer server and host communicating using the OSI model. That is, the OSI model provides a symmetrical communication model. This symmetrical model is not suitable for the weak processing capability of the STB. DATP provides an asymmetrical communication protocol based on the "fat" (large bandwidth and processing power) server/thin (small bandwidth and processing power) client paradigm, designed to be particularly well suited for the interactive television environment.

DATP substantially reduces the overhead per byte transmitted to a minimum. DATP protocol is implemented in a binary format having its own DATP packet format so that the packet overhead is roughly twenty bytes, which is half of that of required in TCP/IP format framing. DATP provides a reliability layer. DATP also provides "unreliable DATP packets" to send to messages to STBs that will not be acknowledged and will not be made reliable through the reliability layer. Unreliable DATP packets are useful for multicasting.

SGW also provides a store and forward function to handle peaks in numbers of orders sent in from multiple users, while rapidly reacting to the user order request. SGW quickly sends an "order acknowledge" to the user in response to user's order and stores the order for transmission later to the application server, which will actually process the order transaction. By sending the order later, a large number of orders can be spread out over time and not have to be sent all at once to the application server. Thus, bandwidth is efficiently utilized. DATP also provides a sliding rejection window based on sequence numbers versus time. DATP/SGW are discussed in detail below.

The Service Platform

Turning now to FIG. 1, the SP in which the present invention resides is presented. The SP 50 comprises a group of applications roughly divided into three categories, Content Conversion 204, Transaction Control/Business Functions 106 and Transport Conversion 108. The SP enables services 200 to interact with a client 212. The services 200 communicate through a communication link 102 to the SP 50. The SP 50 in turn communicates with a client 212. The client 212 may be a STB, a digital assistant, a cellular phone, or any other communication device capable of communicating with the SP through communication link 210. The content conversion 204 and transport conversion 108 services provide the transport and communication function, and the business function services provide the business control functions.

Figure 2:
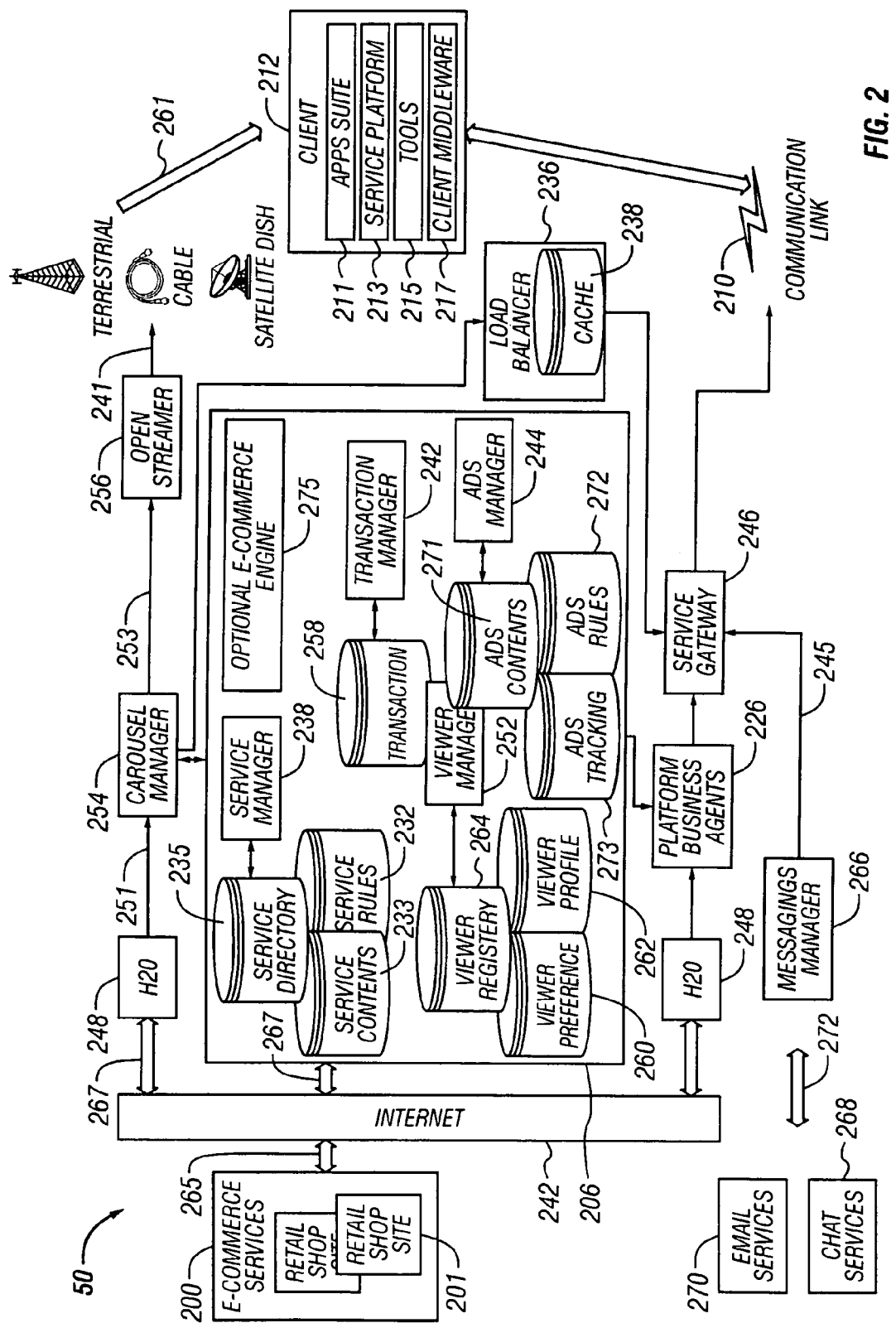
FIG. 2 illustrates an architecture for the service platform in which the present invention resides.

FIG. 2 illustrates an example of a preferred implementation of Service Platform 50. Services 200 provide shopping, chat, and other services either over the Internet or over another network or communication channel accessible to the network operator. Using the SP, the network operator accesses those services. Business functions 206, comprising service manager 238, interact with carousel manager 254 to retrieve content from a service 200. The carousel comprises a repeating stream of audio/video/interactive data broadcast to clients from the SP 50. Carousel manager 254, transaction manager 242 and service manager 238 control the content insertion and deletion from the broadcast carousel. Service content is retrieved and converted into a SP suitable format by H2O 248. H2O 248 is a possible implementation of content conversion 204. H2O converts HTML content into SP/client readable content. The converted content is formatted into a data carousel and multiplexed by the Open Streamer 256 for broadcast to the client 212. Client 212 interacts with the services and if necessary communicates with the SP and the services 200. PTP communication goes through SGW 246. SGW 246 performs transport conversion to convert the STB DATP protocol into a form Platform Business Agents 226 and H2O 248 expect and understand. Load balancer 236 interacts with business functions 206, carousel manager 254, and SGW 246 to determine the optimal load between the broadcast link 241 and the PTP communication link 210. Business functions 206 interact with the platform business agents 226 to control access and information exchange between the services 200 and client 212.

SP hides the operator's valuable subscriber profile database by requiring viewer information is given to a service exclusively by the network operator, and under the network operator's control. To protect the subscriber's identity, an abstracted user identifier (i.e., session identifier) is transmitted to the service during the session that the service transmits transaction details to the SP. The user identifier is session specific. There can be more than one user identifier associated with a client, as when different family members use the same STB. Each family member and the household STB can be individually assigned a viewer identifier, category, tracked as to transactions for purchases/movie requests/viewing habits/ etc. and profiled by the SP Viewer Manager. The service only knows the client or STB identifier through a session identifier. Only the network operator, by way of the SGW can resolve a session identifier into viewer information details (name, address, shipping information, etc.) needed for fulfilling an order. An exception can be made for a credit card number or other information, when the operator does not wish to perform credit card collections or other transactions.

The present invention enables network operators to control access to the viewer information database and allow only those service providers who have an agreement with the network operator to access privileged information (e.g., credit card numbers, viewer actual name, home address, telephone number, social security number, etc.). Viewer manager 252 enables access to personal and profile information stored on the client devices and enables the client devices or SP to select user-preferred content and purchasing habits based on viewing stored in the viewer profile. Clients or the SP select user-preferred content based on viewer profiling via business filters activated in the client device by the client, SGW or another SP component.

The viewer manager 252 provides household/subscriber/ STB (or other client device) identification and authentication in support of the SGW and parental control functions. The viewer manager 252 supports multiple viewer identification and registration authentication at a single STB through nicknames and/or personal identification numbers (PINs) plus, the viewer identifier derived from the client device identifier number(s), transaction history, viewer profiles, nicknames and personal identification numbers. The viewer manager 252 performs household and individual viewer profiling through logging, generation, and matchmaking linked to observed cumulative TV viewing and purchasing habits. The viewer manager supports distributed data capture and storage between the SP and the STB, and supports bi-directional synchronisation.

The viewer manager 252 enables distributed profile usage between all SP applications and provides synchronisation with an external SMS/CRM. The viewer manager 252 enables multiple viewer registrations for a single STB or client device using abstract viewer identifiers comprising pseudonyms or nicknames, full names and PIN storage in the STB or other client device. Business agents 226 enforce transactional business rules for interaction between service providers and viewers. Based on business rules, which are defined by the network operators and based on agreements with the service providers, the business agents 226 control transactions and service provider access to user information. Business agents 226 supplement, add, replace and delete viewer information during a transaction based on the service provider agreements and abstract session identifier.

Business agents 226 create sessions between client subscribers and service providers. Business agents 226 control access to viewer information details and manipulate viewer information by inclusion, replacement and removal of viewer information presented to service providers. The business agents 226 provide default values and control access to user information. The business agents 226 also perform transaction logging, messaging logging, and load/transaction monitoring.

Advertising manager 244 provides an interface with both the broadcast and PTP links, which enables complimentary advertising interaction between the two delivery channels. For example, a broadcast (push) advertisement can trigger a PTP connection to the advertising service via the SP so that the user can buy the product or get more information related to the product. A broadcast advertisement can also be placed in the PTP content to inform a user of the availability of broadcast services (e.g., an infomercial).

In some instances, several products or advertising segments are pushed or broadcast to the client without the client requesting the information. Business filters associated with the client, preferably located in a STB are used to select the best advertisement for the viewer based on user profiles. For example, during a cooking show, the SP may schedule a group of cooking advertisements for broadcast to viewers. This group of advertisements may comprise cooking ads on Italian, French, Indian and German cuisine. The business filter associated with or located in the STB or client will select which type of cuisine advertisement to present to the client. One viewer may see a French cooking advertisement while another viewer may see the Indian cooking advertisement depending on the STB filter set by the client or SP based on user preferences and client profiles.

The SP enables reuse of Web Commerce infrastructure. The SP replaces the 'usual' HTML templates with an SP friendly format . The business agents receive the order requests from the STB or client through the SGW. SGW queues messages (to manage peaks), some orders are received by the business agents with a delay (preferably orders that do not need any form of confirmation would use this scheme). The business agents add viewer information to orders. The amount and type of the viewer information provided in a order/message is guided by business rules depending on the service/retail agreement.

As communications between services and viewers/clients the information are sent to either separate carousels with a single carousel per transport stream or merged into the existing application carousels. Orders then may proceed, if desired through a 'credit card clearance' function provided by the SP. As confirmations are sent back from the retailers, the orders are sent real-time back to the user sent via email to the user or made available on-demand through some form of customer care application.

The SP also provides offline viewer identification (OVI), which enables a viewer to be identified or authenticated without an online viewer connection established. This ensures that the connection delay (e.g., 10-40 seconds) can be placed at the most appropriate place within the purchase process. This also enables viewer identification along with the store and forward function. OVI enables communications and completion of orders/operations with a client device that is intermittently on and off.

An offline order form function is provided which enables the SP to provide T-Commerce services for a viewer to add items to an order form (shopping cart) without being online. The store and forward function is important for achieving greater scalability. Store and forward may be either forwarding in off peak hours or simply spreading the load over a given time period after a transaction has been initiated. The full store and forward solution is integrated with the so that responses can be forwarded from any channel at any time. Store and forward can be used for enhanced E-Commerce, T-Commerce transactions. The offline viewer authentication enables offline payment selection. Offline payment selection is provided by the SP to improve the purchase process and to enable use of the store and forward function with T-Commerce/E-Commerce.

The SP uses standard Web transport where applicable, i.e., it uses HTTP for real-time requests, and SMTP for asynchronous communication where applicable (e.g. merchant reporting, store and forward). Even when going online, the SP provides the ability to connect for a short period of time to access data (e.g., email) then uses the data locally. The SP provides session-based identifiers instead of the typical Web cookies to protect the operator viewer database. Instead of Web cookies, the SP provides a session-based identifier that cannot be used by the service to identify the user, only the session. The service must request the viewer information from the SGW (and be charged for it by the network operator).

The SP optionally informs the viewer when a connection takes place, and also can optionally ask for the viewer's approval to maintain the connection. The SP also displays a "Connection ON" status on the viewer's screen. The SP uses broadcast bandwidth for PTP communication when it is more efficient. A load balancer is provided that determines which information goes over the broadcast and which information goes over the PTP connection. Load balancing decisions are based on the urgency of the data, the delivery latency of the broadcast versus PTP transmission links, the comparative load on the broadcast and PTP paths and the number of viewers receiving the data. Generally, data going to a large number of viewers is broadcast, and small data quantities that need to be sent immediately are sent over the PTP link. STBs without a broadband tuner will receive PTP messages sent out along with broadband.

SP provides STBs and/or clients with filters which selectively receive information in the broadcast path based on viewer profiling, so that only selected viewers having a particular filter set up in their STB captures content (advertising, information or A/V programming, etc.) in the broadcast stream. These filters enhance the adaptive and selective delivery aspects of the SP. The Carousel Manager provides a data carousel for Open Streamer. The Carousel Manager manages a carousel of data in real-time. The Carousel Manager complements Open Streamer. Carousel Manager provides a server component and an STB client OCOD library. The Carousel Server receives requests from applications to add to, remove from or otherwise change the carousels contents. As Carousel Manager receives a request, it treats it as a single transaction, and obtains all necessary data (usually through HTTP). The Carousel Manager generates new carousel index or carousel directory file as needed. Carousel Manager publishes the updated carousel directory to Open Streamer, thereby controlling Open Streamer's broadcast priorities and tracks.

Open Streamer is a software/hardware product that enables network operators to broadcast SP applications and data in their network broadcast. Open Streamer enables SP data and applications to be transmitted simultaneously with the network operator A/V programs. Open Streamer enables a data stream to be updated in real time to match the A/V contents. For example, a network operator can broadcast an interactive sports application along with the live broadcast of a sporting event. Open Streamer comprises two components, a common server DLL and a broadcast streamer. An application server (e.g., a weather application server) or the Carousel Builder in the SP calls the common server DLL to send the carousel data to the broadcast streamer. The broadcast streamer then performs multiplexing (according to code/data ratio and bit rate requirements) of the applications and A/V data and sends the multiplexed data to the broadcast equipment for broadcast.

DAP/DATP Protocol Scheme Overview

Figure 9:
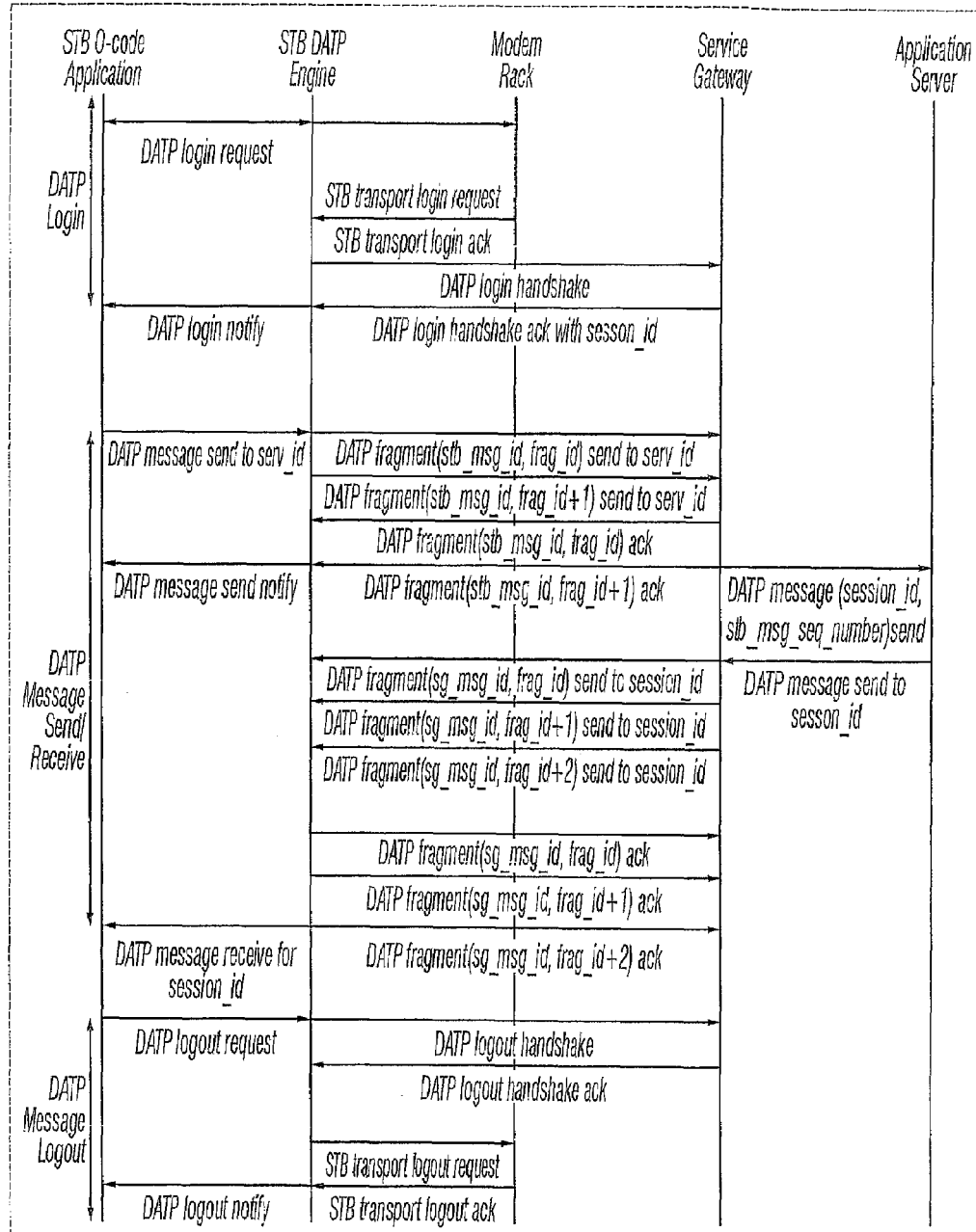
FIG. 9 illustrates a sample DATP session between a STB and an application server.

The present invention enables communication between STBs and service providers associated with a SP. DATP protocol is a message-based protocol where an entity sends a message to another entity with a delivery guarantee. Any time the STB sends a message to the SGW, STB receives an acknowledgement message once the message has reached its final destination (SGW or an application server). When an application server has processed the message, a response message may be sent to the STB provided that the STB session with SGW is still open. The DATP message transmission phase will be preceded with a DATP login phase and followed by a DATP logout phase needed to establish a DATP session. DATP is a session-oriented protocol. FIG. 9 illustrates a simple example of DATP session.

DATP supports multiple sessions on top on the same STB Transport layer connection. STB clients can send in the middle of an open session with the SGW login packets to start a new session on the same STB transport link used for the first session. Both DATP session management modules in the STB client and in the SGW multiplexes the various session messages over the same link.

DATP Packet Content Overview

The DATP Protocol packet comprises a fixed size header, a variable size data payload (DAML messages) and a trailer. The Header comprises the following elements: Protocol Version Number; Packet type (Login/Logout Handshake, Ping, Data, Acknowledge, etc.); Actual Transport Info (Raw, TCP/IP, UDP, etc.); Message Sequence Number (DATP message number generated by STB or SG); Service Identifier (ID of the service to receive the data). The service id is an 8-bit identifier defined in the DATP protocol. Session ID (Session ID is provided by SGW at handshake); Encryption Flags for encrypted sessions; and Payload Data Size.

The Payload Data may contain the following depending on the packet type: Login/Logout info for Handshake packets; Acknowledge Info for Acknowledge packet; Data Payload for data packet. The trailer will contain at least the 32 bits CRC checksum of the DATP packet. The DATP protocol byte ordering is BIG ENDIAN.

Packet Fields Specification

The Protocol Version field is the version of the DATP protocol used by the transmitting entity. It's the first byte of a DATP packet. The DATP packet format may vary based on the DATP protocol version number. When new versions of the DATP protocol are specified, this version number is increased to reflect the changes. DATP communications between two entities will use the highest version of DATP available on both entities. The version negotiation will be part of the login process.

The Packet Type Info field is the second byte of a DATP packet. It indicates what type of DATP packet is being sent. STB transport Info field is the third byte of a DATP packet. It provides information on the transport used on the STB side. It is divided in 3 sub-fields: STB_transport_info[7..4]: The four MSB bits of the field represent the STB native transport protocol type. STB_transport_info [3]: This bit indicates if the underlying transport is reliable. Note that this bit has is set to the correct value even if the native transport protocol type value can provide a good indication of the protocol reliability. STB_transport_info [2..1]: This bit indicates the speed class of the native STB transport.

The Service ID is the forth byte in a DATP packet and indicates the id of the destination (STB to SGW packets) or transmitting (SGW to STB packets) host of a DATP packet. The session ID is the second quadlet (double word) of a DATP packet. It indicates the session id of the DATP packet. Session id values are generated by the SGW during the login process. Login packets have their session id field set to 0.

In DATP, a sequence number is the first word of the third quadlet of a DATP packet. It indicates the DATP message sequence number. This number identifies a DATP "transaction" from a packet sent to its corresponding acknowledge. Message sequence numbers are generated by the transmitting entity and are unique only across the messages sent on one leg of a DATP connection. This means that a DATP message sent from the STB client to the SGW and a message sent from the SGW to the STB client can have the same sequence number but still correspond to two separate "transactions".

In DATP data size is the second double word of the third quadlet of a DATP packet. It indicates the size of the payload data of the packet in bytes. By construction this size is limited to 64 KB to accommodate various common factor on low end STBs such as slow modem links, extremely noisy communication channels, limited RAM memory resources, etc. In DATP, encryption flags constitute the first byte of the fourth quadlet of a DATP packet. The DATP data payload starts from the first byte after the 16 bytes fixed size header up to the size of the Data payload as indicated in the header data size field. In DATP, CRC is the first quadlet after the data payload. It contains the value of the 32 CRC checksum of the whole DATP packet (header included).

The Login packet is sent by the STB client to initiate a DATP session with the SGW. It represents the first phase of the login process negotiation where the STB introduces itself to the SGW. The SGW answers to a login request with an acknowledge packet in case of success. It will decide on the negotiable attributes of the DATP connection and it will assign a session id to the newly created session.

The SGW will answer to a login request with a negative acknowledge packet in case of failure. This packet is sent by the STB to close a DATP session with the SGW. The SGW will answer to a logout request with Logout Acknowledge packet in case of success.

The SGW answers a logout request with Logout Negative Acknowledge packet in case of failure. Cases of failure include errors like unknown session id, bad crc, etc. A data packet can be sent by any entity of a DATP connection. A STB client application can send DATP data packets to Application Severs and Application Servers can respond back to a STB forcing the transmission of a data packet from the SGW to the Client STB. An entity that received a Data Packet will answer with Data Acknowledge Packet on successful reception. An entity that received a Data Packet will answer with Data Negative Acknowledge Packet on unsuccessful reception. If no packet has been received from a remote DATP entity for a configurable period of time, the other remote entity could test the DATP link by sending a DATP ping packet and waiting for a reply. A remote entity that received a ping packet must send a Ping Acknowledge packet to its remote peer if the ping packet was successfully received. A remote entity that received a ping packet must send a Ping Negative Acknowledge packet to its remote peer in case of unsuccessful reception of a ping packet. Cases of failure include errors like unknown session id, bad CRC, etc.

Figure 3:
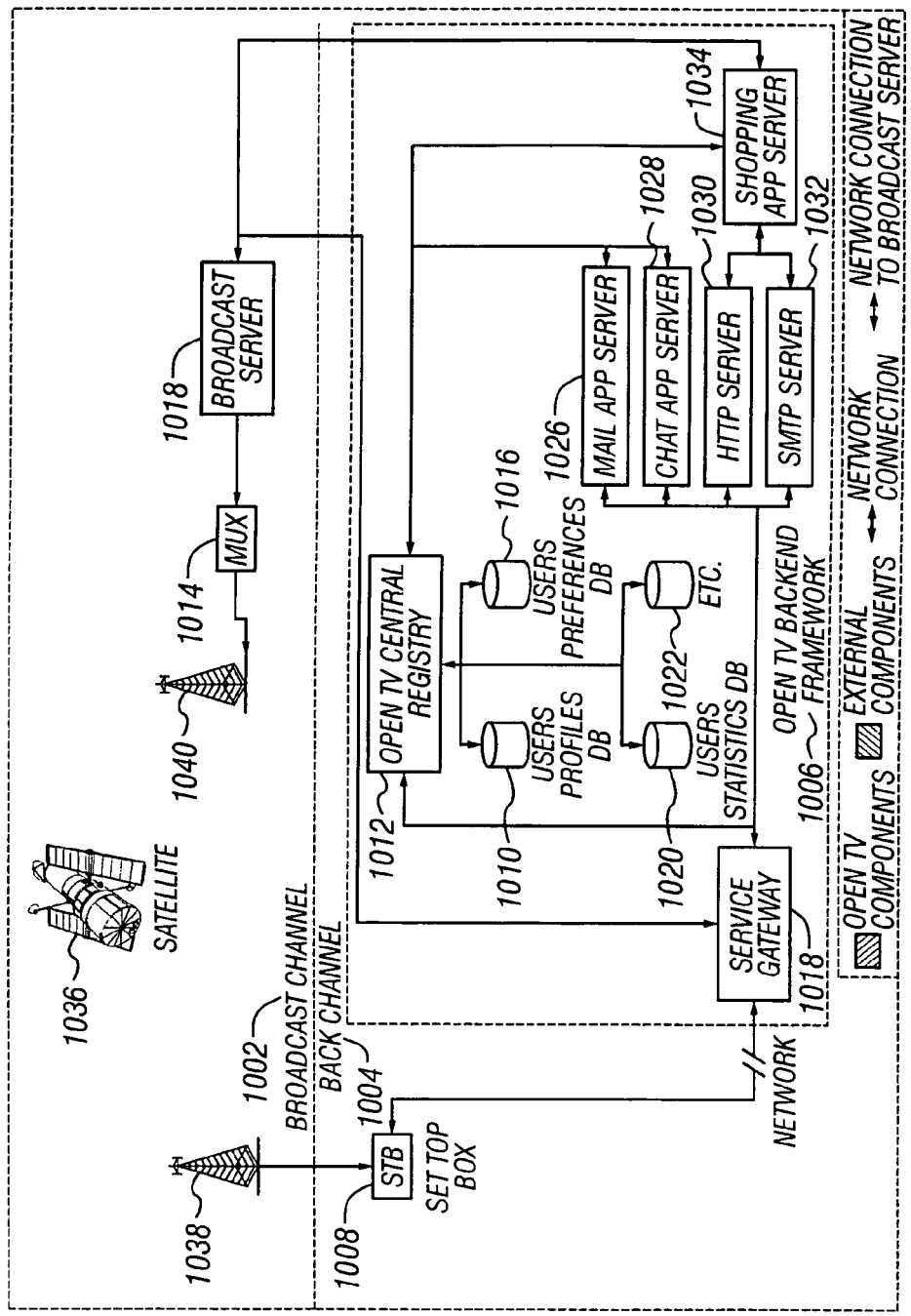
FIG. 3 illustrates an example of a preferred application backend framework of the present invention.

Turning now to FIG. 3, the following summarizes the architecture for DATP/SGW as shown in FIG. 3. A large number of SP and STB client applications have common needs that are more transport specific than application specific that are addressed in the DATP architecture. DATP performs encryption, data compression, HTTP routing, and many other functions discussed below. The architecture for the DATP application backend framework is illustrated in FIG. 3. DATP provides Lightweight HTTP (LHTTP) at the O-code application level, store and forward function, STB Identification (using the OpenTV Central Registry [OCR]), and many other functions. These functions are provided as part of or on top of the DATP protocol.

As shown in FIG. 3, the SGW server 1018 provides a robust communication link between the STB 1008 and a variety of application servers 1026, 1028, 1030 and 1032, including the FetchMail server 1026. SGW 1018 routes requests back and forth from the STB to application services. SGW receives DATP packets from the client/STB 1018, contacts the appropriate application server, and sends/receives data to the application server via TCP/IP connection. SGW enables a Third-Party server, or SP specific servers such as the FetchMail server 1026, to send messages to the STB.

Figure 4:
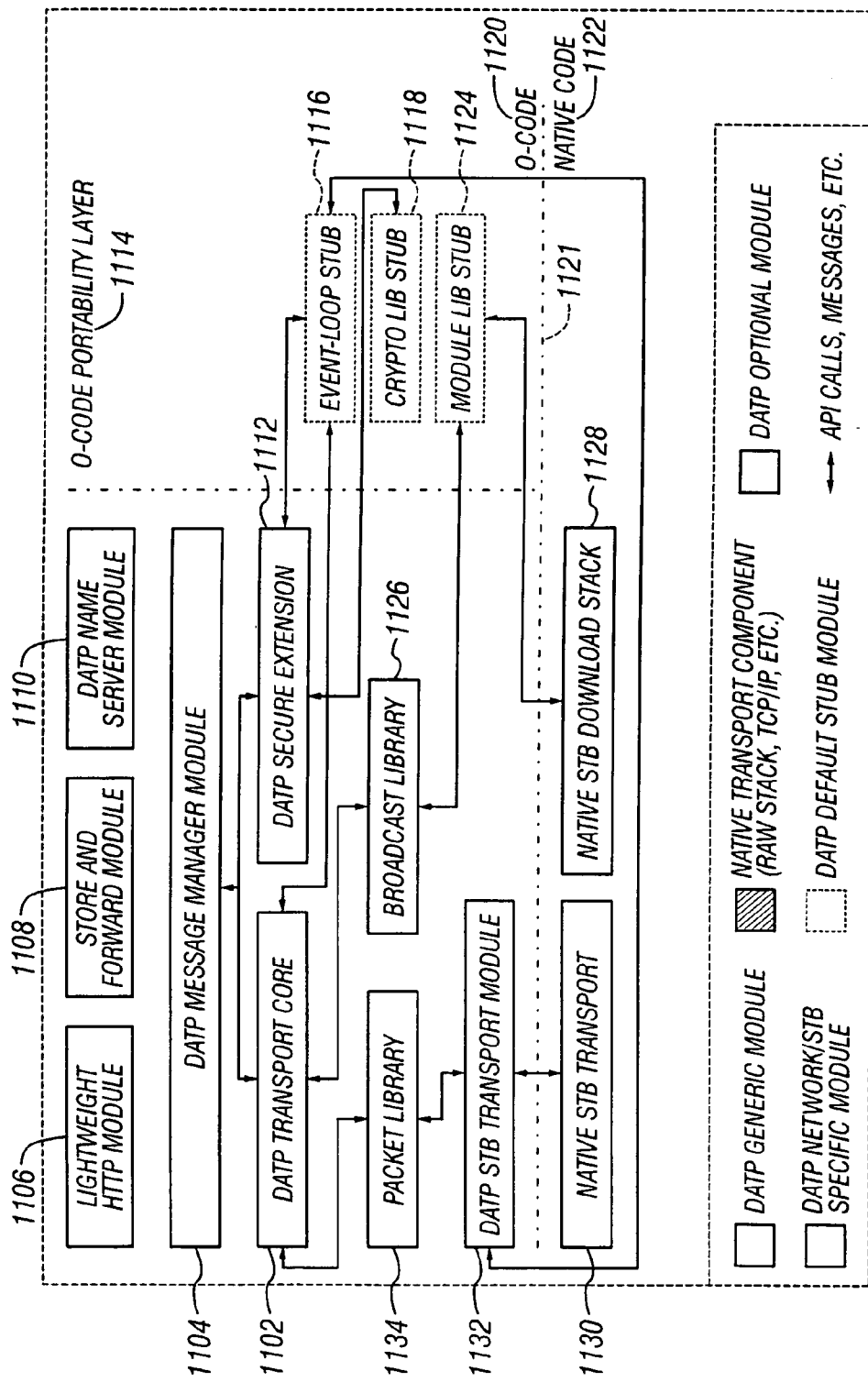
FIG. 4 illustrates an example of a preferred DATP STB Stack architecture of the present invention.

As shown in FIG. 4, the STB/client stack architecture features a plurality of modules as well as an extra layer, message manager 1104 between the application and the native STB/client transport. APIs are provided to STB applications such as an LHTTP API 1106 and a store and forward API 1108. The server uses an asynchronous version of the PAL layer, implements pools of threads and process isolation techniques.

In a preferred embodiment, DATP provides increased message sizes while guaranteeing delivery reliability and addressing complex memory issues due to constrained embedded environments in the STB. In order to increase DATP message size, large messages are divided into smaller sections, transmitted, reordered and delivered in a reconstructed DATP message. On a non-reliable link with a binary error rate (BER) of $10^{-64}$, the probability of having an error on a 64 KB message is roughly 7% (1 message out of 14). Knowing that transferring 64 KB takes a bit more than five minutes over a 2400 bits/s modem, DATP avoids retransmitting the same message for another five minutes just because one of its bits is corrupted. To avoid retransmission, the following implementation guidelines for DATP are preferably as follows.

Figure 8:
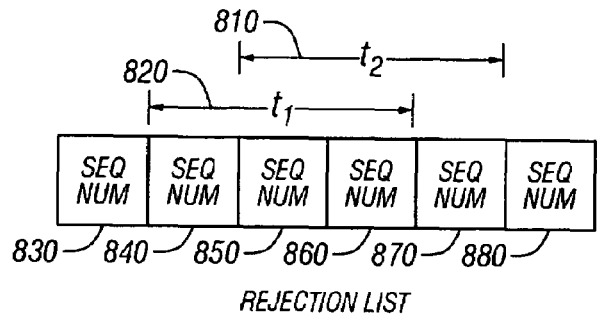
FIG. 8 illustrates the sliding rejection window of the present invention.

In a preferred embodiment, large messages, that is messages over 64 Kb, are fragmented into smaller DATP packets. Smaller fragment thresholds less than 64 kb may be used. Each DATP fragment is acknowledged separately. As shown in FIG. 8, DATP keeps track of message sequence numbers and the time at which the sequence number was last used. DATP messages with a "recently" used sequence number are rejected as "already received." To implement this policy DATP hosts maintain a sliding window of recently used sequence numbers with a timestamp on each sequence number. Older sequence numbers are removed from the window of the remote host if they are older than (host_max_retry+1) *host_timeout. In a preferred embodiment the time out value is programmable and can be set to any value desired.

The rejection window keeps track of the sequence numbers of packets received in a certain time frame starting from current time. When the DATP core layer receives a packet, its sequence number is looked up in the rejection window. If the sequence number is found in the window, it is discarded, that is, the packet or fragment associated with that sequence number is ignored. If the sequence number of the packet is not found in the window, the new sequence number is added to the window. The window or "rejection window" is periodically cleaned to get rid of packet numbers older than a certain date depending on the time used on the communication link. The packet rejection window algorithm provides an efficient protection against multiple receptions of identical packets which can occur frequently with retransmission/timeout based reliable message oriented transport protocols.

DATP messages are sent based on remote host memory conditions. Each acknowledged packet of a DATP message contains a memory available field that indicates current memory condition of the receiving entity. Utilizing DATP, to send a message to a peer, a remote entity first checks to see if the size of the DATP message is smaller than the memory available in the receiving entity. If there is sufficient memory available at the receiving entity to receive the message, the fragments of the DATP message are sent to the receiving host. Upon receipt of the message, the receiving host acknowledges receipt of the message. Otherwise the transmitting host sends control packets to the receiving host to query for the remote or receiving host's memory availability. Partial delivery based on available memory holding only a portion of a message may also be implemented if desired. In this case, partial messages are cached until completed. The control packets are sent until sufficient memory is available in the remote entity or until the maximum number of message send retries is exceeded. If the maximum number of retries is exceeded and there is still not enough memory available at the receiving host to complete message transmission, then the message transmission fails (unless partial message delivery is authorized).

DATP protocol is a message-based protocol where an entity sends a message to the other entity with a delivery guarantee. Any time the STB sends a message to the service gateway it will receive an Acknowledge message once the message has reached its final destination (The Service Gateway itself or an Application Server). When an Application Server has processed the message, a response message may be sent to the STB provided that the STB session with the Service Gateway is still open. The DATP message transmission phase will be preceded with a DATP login phase and followed by a DATP logout phase needed to establish a DATP session. It is important to note that messages sent through DATP are fragmented into DATP packets of at most MTU (Medium Transmission Unit) bytes that are transmitted and acknowledged independently. This allows DATP messages to be as large as physically manageable by DATP entities. FIG. 9 presents a simple example of DATP session.

DATP supports multiple sessions on top on the same STB Transport layer connection. STB clients can send in the middle of an open session with the Service Gateway login packets to start a new session on the same exact STB transport link they are using for the first session. Both DATP session management modules in the STB client and in the Service Gateway will be in charge of multiplexing the various session messages on the same link.

To support large DATP message transmission, DATP relies on a packet fragmentation/reconstruction scheme. Large messages are fragmented into small DATP packets of at most MTU size. Each host has a MTU size and each DATP entity can have a different one. Each fragment (DATP packet) of a DATP message is acknowledged separately.

DATP message with "recently" used sequence number will be rejected to avoid "multiple reception of identical fragments" type of race conditions. To implement this policy DATP hosts maintain a sliding window of recently used (sequence number, fragment id) with a timestamp on each entry in the window. Old (sequence number, fragment id) entries will be removed from the window of a DATP host if they are older than (host_max_retry+1)*host_timeout.

A Default DATP fragment size (i.e. MTU size) is limited to 4 KB to accommodate constrained STB environment where memory fragmentation is an issue. Fragment size can be increased to a maximum 64 KB at the application discretion.

DATP supports up to 65536 fragments per DATP message. This gives a maximum theoretical message size of 4 GB. A DATP message's first fragment provides a marker indicating that the fragment is a new message first fragment and its fragment identification (id) field is set to the number of fragments composing this DATP message. Incomplete DATP messages should be discarded by remote entities after (host_max_retry+1)*host_timeout.

DATP provides encryption to enable applications to send sensitive data back to their respective application servers. Providing encryption at the transport level addresses the challenge of providing encryption in STB or client low processing capacity environment. Thus, encryption is addressed with a carefully designed encryption scheme and a preferred DATP secure API. Security/encryption is provided at a session level. Applications open a secure session using DATP secure API. DATP encryption parameters are negotiated at session login. Secure session negotiation is provided in at least two phases: during a standard DATP login phase, and during a key negotiation phase.

A brief description of the main steps of the key negotiation phase follows. The DATP Server sends its public key server_epk to a client or STB. DATP preferably uses Rivest, Shamir, & Adleman (public key encryption technology) RSA (others may be used). DATP chooses the RSA exponent server_epk=(e, n) so that e=3 or greater while maintaining a robust level of security (security depends only on n). Since to encrypt a message with RSA the STB needs to compute ($m^e$) mod n. A small "e" means that the exponentiation phase will be small, leading to a faster computation of the encrypted message. The STB or client initializes its random number generator with the system time plus any random source available to the O-code layer (example: current video frame, etc.). The STB/client picks an STB/client secret key (stb_sk). The STB encrypts the secret key, stb_sk with server_epk using RSA. The STB sends encrypted secret key, stb_sk to the DATP server. The DATP server decrypts encrypted stb_sk with its private key server_dpk.

The DATP server (e.g., SGW) initializes its random generator and picks a server secret key server_sk. The DATP server (e.g., SGW) encrypts server_sk with stb_sk using a secret key encryption scheme. The DATP server sends encrypted server_sk to DATP server. The STB decrypts encrypted server_sk with its secret key stb_sk. Once the keys have been successfully exchanged, secret encrypted data can be exchanged between the two entities via DATP using each other's secret keys. In a preferred embodiment, a DATP server authentication step is added to the protocol, to enhance key exchange scheme and make it robust against "man in the middle" attacks. Thus, signing DATP stacks and managing authentication certificates is provided in the DATP protocol.

To minimize communication time with SGW, the public key of the server is preferably embedded in the stack so that encryption of the STB private key can be performed off-line. This introduces a new key management issue since the DATP server should know the server public key used by the STB or client. Messages sent over a secure session will preferably be encrypted at the fragment level. This means that each individual fragment of a DATP message will be encrypted independently.

A DATP Secure API is provided with the ability to send unencrypted messages over a secure DATP session, which provides SP applications the option of saving CPU cycles by not encrypting non-sensitive data sent over a secure session. This is useful for clients or STBs with limited processing power, such as the Motorola DCT 2000.

Once a secure session is established between a DATP server and a DATP client or STB, messages sent by the client/STB to any application server are first decrypted by the DATP server (e.g., SGW) and then forwarded to application servers using a secure socket layer (SSL) connection. The encryption layer is based on a cryptographic library available to O code developers as well as application server developers. This library can be used by applications to manage encryption at the application level. This ability might be useful to manage end-to-end encryption for security in critical applications such as banking applications.

Data compression on slow links such as the ones available on most STBs and clients (2400 to 33600 bps) it is desirable to send compressed data to increase the total throughput of the line. In some cases modem data compression is available at OSI link level. Higher-level protocols do not gain appreciably by compressing their payload. A large number of client/STB modems do not offer compression at the link level so compression is provided by higher-level protocols. The present invention provides data compression at DATP server level.

The challenge is that STBs or client processors lack capacity to perform efficient pattern searches (or other CPU-intensive operations) needed by most compression algorithms. Decompression, however, is a relatively easy task and decompression APIs are provided to the client/STB at the O code level. Based on these considerations DATP support for compression is asymmetric, that is, only the downlink from the DATP server to the STB or client is preferably compressed using standard SP compression tools.

Compressed DATP packets possess a "data compressed" flag in the packet header indicating that the payload data is compressed. Packet headers are not compressed. Compression and decompression will use standard provided SP compression and decompression tools and APIs. DATP packet size indicates the size of the compressed payload. The decompressed size of the payload will be indicated in the payload's compression header. Compression of DATP messages is performed at the fragment level. Each individual DATP packet of a DATP message is compressed independently. This is preferred since DATP message fragments are not necessarily stored contiguously when received, thus, it is preferred that DATP decompress each fragment separately. Independent decompression is possible since each DATP fragment is compressed independently. The DATP STB stack and the DATP application server API can disable or enable data compression on the downlink. This feature provides application servers at least two important capabilities, the ability to transfer large amounts of data to clients or STBs using the high-speed broadcast channel and the ability to send multicast data to a collection of clients or STBs through the broadcast channel saving overall SP bandwidth.

DATP server provides an Open Streamer application server module that manages a configurable number of broadcast streams. These streams are used to send large chunks of data as well as multicast data to clients and/or STBs. Multicasting is provided as a feature important as routing over broadcast since it enables application servers to send data to a group of STBs without addressing each STB individually. Multicast support in DATP provides unreliable DATP packets. The SP maintains multicast group's list of session identifiers and handles cases where an STB or client with no broadcast tuner available is a member of a multicast group.

DATP Name Service (DNS) provides a mapping between application server names and service identifiers. Though well known services have reserved service identifiers, a large number of user-defined service identifiers are available and can be used by various applications. To avoid hard coding of service identifiers in STB or O-code applications, applications have the ability to refer to services by name after a name resolution stage. This way the application is less dependent upon the SGW configuration file.

The following is a description of how DNS capabilities are provided to DATP clients. DNS is viewed as just another service from a DATP protocol standpoint. A specific service identifier is reserved for the DNS service. The DNS service is hosted within the SGW or may be hosted elsewhere in the SP or in a STB or other client. The DATP client provides a simple API to resolve names of application servers. Preferably, the main call (datp_get_asid_by_name (as_name)) returns a request number synchronously. An asynchronous notification returns the status of the name resolution including the application server identifier in successful cases. Concurrent name resolutions are possible with no significant detrimental consequences on performance. Users are able to dispatch name server notifications based on a request identifier tagged to each request. The Application Servers' name parameter is added to the current DNS configuration file. The same name is not be used for different service identifiers. To achieve redundancy or satisfy scalability issues registering several machines per service identifier are supported.

In the preferred implementation, DNS is considered as an instance of a yet to be defined directory service. DNS request packet format comprises the following fields: Query Type (indicating the type of query (0 for DNS query for instance)), Query Tag (user provided tag to be matched against directory service responses), Query Data (data used to perform the query operation (typically the name of the service for DNS)). The DNS response packet format comprises the following fields: answer type (indicating the type of answer (0 for DNS resolve OK)), answer tag (same as the query tag that generated the answer) and answer data (query's response data (typically the id of the service for DNS)).

In an alternative embodiment of DATP, the assumption is all DATP clients are behind a modem rack and for each connected client the modem rack terminal server opens a dedicated TCP/IP connection with the SGW and forwards whatever it receives from a given STB to this TCP connection. With the possible deployment in older generation cable boxes with no TCP/IP support, but with User Datagram Protocol (UDP) the DATP server (e.g., SGW) provides the ability to listen on a UDP port. UDP is supported as follows. On the Server a new datp_socket_listener class is created to handle UDP connections. A socket type abstraction layer is created to accommodate UDP sockets (PAL_udp_socket).

UDP connections are processed as follows. UDP_listener reads the new connection request datagram and creates a new AL_udp_socket. UDP_listener replies to the connection, sending the datagram using newly created PAL_udp_socket. UDP_listener creates a new Session Manager thread passing the newly created PAL_udp_socket as an attribute. The new session manager talks back directly to DATP client using pal_udp_socket_send with the provided PAL_udp_socket. Note that the remote address of the datagram need not be specified. It is already set by the UDP_listener while answering the connection request.

On the client side a UDP stb_transport module is created that implements the already specified stb_transport API on top of whatever UDP API is available in the targeted STB or client. This UDP stb_transport preferably sends a connection request datagram to the SGW UDP listener port and waits until it receives a reply from the SGW before notifying the DATP core that the STB transport link is up. Subsequent datagrams are sent using the port specified in the connection request reply from the SGW.

HTTP routing is provided to provide an interface for the SGW with standard application servers that use Web servers as their front-end. In this case, DATP preferably does not use the standard DATP application server API that is provided to application server developers, but instead interfaces directly with these application servers by forwarding DATP messages to their Web server front-end using the HTTP POST (HTTPP) mechanism. In this scheme, client and/or STB applications use the DATP API unaware that they are talking to an HTTP server.

In order to support HTTPP, a DATP application server type is provided. All servers of this type are provided with an extra entry in the name server configuration file to specify their post URL. The application server communication module provides the ability to post DATP messages to HTTP servers depending on the targeted server type. Preferably, this module is divided into an application server (AS) communication manager and two AS data senders. One AS data sender sends data to the DATP AS API compatible application servers and another one sends data to HTTP based application servers. HTTP cookies received from the HTTP server are stored in the SGW and are resent to the HTTP server as needed. DATP messages received on a secure DATP session are forwarded to HTTP servers using HTTPS. DATP login and logout are preferably not anonymous, to enable the SGW to control access to SP interactive services and to offer a way for application servers access to the identity of a connected client.

The following further describes STB or client identification as part of DATP. DATP stacks contain a STB or client dependent unique hardware identifier (HID). In the case of an STB this hardware identifier is retrieved from the STB/Network dependent STB transport layer. The HID format is a variable length character string. The HIDs for a given network are stored in a HID list. The network operator, via SP updates the HID list from its customer database using APIs. In the case in which one cannot interface directly with the network operator subscriber database, the SP imports the subscriber information (including their HID) from a flat file.

To establish DATP sessions, STB or client DATP stacks include their HID within the DATP login packet. The SGW checks the validity of the HID using a central repository. Once the central repository clears the HID, access is granted to the STB stack. The HID enables the SGW to determine the identity of a connected STB or client. Similar to HTTP cookies, HID does not "strongly" authenticate a remote STB or client. Thus, formal authentication of remote users preferably will be performed by applications that require more robust authentication of their remote peers.

DATP provides LHTTP of HTTP functions to O code application developers that enable them to interact with remote HTTP servers. LHTTP is provided to enable development of Web-like HTTP based applications. LHTTP completes the current H2O strategy by offering an OS independent simplified HTTP interface for back channel communications between the client, the network operator and services. The LHTTP interface is based on the DATP stack, encapsulating HTTP requests into DATP messages. A special DATP service identifier is assigned to the LHTTP layer and DATP messages received on this service identifier, which are routed to the destination HTTP server using a specific LHTTP data sender module in SGW.

Preferably, a limited set of HTTP commands is supported, comprising GET and POST commands. Additional HTTP commands can be added to LHTTP. LHTTP requests are transformed into real HTTP requests at SGW. HTTP requests are made from the SGW on the behalf of LHTTP clients. Cookies are forwarded to LHTTP clients. SGW caches the cookies and maintains a cookie to session ID translation table. DNS answers HID resolve requests from HTTP servers using this translation table. HTTP servers preferably use the HID to extract user information from the central registry server. LHTTP also provides a secure API, LHTTPS. This API is based on the DATP encryption layer. LHTTPS requests are automatically translated to HTTPS requests at SGW.

Simple Mail Transfer Protocol (SMTP) routing or simply forwarding messages by email are provided to the interface between the SGW and application servers. This interface can be used for non real-time transactions where an application sends DATP messages to SMTP-based application servers and these messages are forwarded by e-mail to the targeted application servers.

In order to support SMTP routing, a DATP application server type is created for SMTP application servers. Servers of this type have extra entries in the name server configuration file to specify their email address as well as the email subject of forwarded messages. The application server communication module posts DATP messages to SMTP based application servers depending on the targeted server type. A SMTP application server data sender module is provided to support this type of transaction. DATP messages sent to SMTP application servers are attached to multipart Multipurpose Internet Mail Extensions (MIME) encoded emails. The first part of the message contains the hardware identifiers of the senders as well as the DATP message ID of the messages being forwarded. The second part of the message contains MIME encoded DATP messages.

DATP messages sent to an SMTP application server are acknowledged once the message is decoded by a session manager and is ready to be sent by email to the targeted application server. Subsequent SMTP related errors might occur once the SGW makes an email delivery attempt of the DATP message to the targeted application server. Messages sent using the DATP encryption layer would be forwarded unencrypted to the final host. PGP encryption is also supported to securely route DATP messages over SMTP.

The DATP store and forward service provides functionality for applications to send non real-time messages to a specific application server. A store and forward library is provided on top of DATP. Application uses the store and forward module to send messages with different timing constraints depending on their needs. Timing constraints vary from "as soon as possible", "a specified time", "a specified occurrence, event or message" to "whenever we get connected" including "after a random period of time".

The store and forward module stores undelivered DATP messages into the file system along with some specific attributes (time stamp, timing constraints, targeted AS identifier, etc.). The file system storage path is configurable at least at compile time to accommodate a specific network. Messages not forwarded while a given DATP store and forward enabled application is running are not forwarded until another store and forward enabled application starts running. The store and forward module does not alter the content of the forwarded DATP message. The message is forwarded without alteration to the targeted application server.

Turning now to FIG. 4, the DATP architecture of the client stack comprising a plurality of modules is illustrated. Modules below line 1121 are written in native client code while modules above line 1121 are written in O-code. The lightweight HTTP module 1106 provides lightweight HTTP capabilities to O code applications. It is implemented on top of the DATP API. The store and forward module 1108 provides store and forward capabilities to O code applications. It is implemented on top of the DATP API. The DNS module 1110 utilizes the DATP message manager module 1104 to provide DATP name resolution services. The DATP message manager module 1104 provides the front end of DATP. All DATP message-related API calls go through the DATP message manager module. This module divides messages into DATP packets and reconstructs DATP packets into messages. The DATP transport core module 1102 manages DATP sessions, sends and receives DATP packets, and manages DATP module reception from broadcast. The DATP secure transport extension module 1120 handles secure DATP sessions. The DATP packet library 1134 provides the functionality for reading (parsing) and writing (composing) DATP packets to the DATP STB transport module 1132 based on the DATP packet format specification. Upon reading a complete DATP packet, this module will notify the DATP Transport core with the parsed DATP packet.

The DATP broadcast library 1126 listens on selected SP streams based on the DATP transport core 1102 specifications, waiting for modules intended for a given STB or client and notifying the DATP transport core 1102 with the parsed DATP modules. The DATP STB transport module 1132 provides a link-level packet interface on top of whatever native transport or data link is available on the DATP host. The event-loop stub 1116 provides a stubbed version of the message API specified in the DATP portability later. This stub is based on the common library event-loop. The role of the portability layer 1114 is to abstract the DATP stack from application dependent issues such as message dispatching mechanism, encryption APIs, etc. The cryptographic library stub 1118 is a stubbed version of the cryptographic API specified in the DATP portability layer. This stub is based on the common library cryptography package. The module lib stub 1124 is a stubbed version of the multi-track module download API specified in the DATP portability layer. This stub is based on the common library's multi-track module download package.

Figure 6:
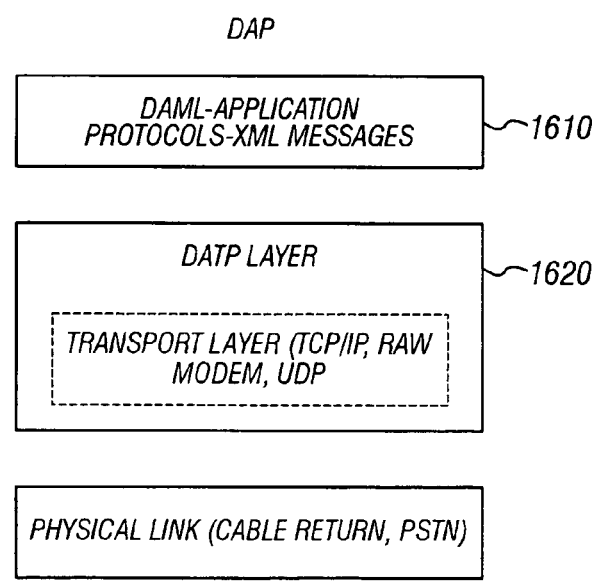
FIG. 6 illustrates DAML and DATP as a subset of DAP.

Turning now to FIG. 6, DATP is a subset of the Digital TV Application Protocol (DAP). DAP/DATP is depicted in FIG. 6. DAP is used to standardize back channel communications between SP applications and SGW. DATP and SGW provide a generic virtual transport mechanism to SP applications, since not all SP enabled STBs provide a TCP/IP stack extension. Moreover, some of the STBs run their own proprietary stack or provide no communication stack at all.

DAP is a simple lightweight application protocol suite. DAP's main purpose is to provide a simple and effective way to leverage existing application protocols, such as POP3, SMTP, internet message access protocol (IMAP) and others onto low-end STB's. STBs often possess low capacity processing resources and/or proprietary communications protocols. DAP is designed to abstract communications complexity from the application providers, which in turn leverages existing network infrastructure for today's application standards.

As shown in FIG. 6, DAP is divided into two parts: DAML 1610—digital TV application Meta language and DATP 1620—digital TV application transport protocol. DAML 1610 is a Meta language that spans many SP applications. Each SP application has its own domain of DAML. The client application responds to and requests messages encapsulated in a DAML domain. These request messages are translated by application servers into the appropriate protocol for existing applications, such as SMTP or IMAP.

DATP 1620 is a lightweight, simple transport protocol designed for low bandwidth applications when TCP/IP or another known protocol is not available. DATP is designed to interface with existing communication protocols in current STBs. DAP comprises: DATP, DAML-Mail (XML domain for mail); DAML-Regi (XML domain for account registration); and DAML-Acct (XML domain for accessing SP VMS/AMS system).

Typical STBs are based on a thin client architecture, that is, possessing minimal processing capability. The services provided by today's STBs are often low-end, "dumb" applications. Today's resource intensive applications such as email, chat and Internet browsers require more powerful processing appliances. Today's STB cannot provide this type of processing power, hence the need for a low-end, lightweight application protocol. DAP is simple enough to hide or abstract the client/server network complexity from the application developer.

DAP is modular, flexible and adaptable to today's emerging software architectures. Which could be either a Common Object Request Broker Architecture (Object Management Group) (CORBA) based model or Common Object Module (COM)/Distributed Component Object Module (DCOM) model. DAP is flexible enough to accommodate and integrate with existing third party legacy systems. DAP provides an interface to various open and proprietary protocols. These protocols exist for service systems where the PC is the main client, for example, IMAP or POP3 services. DAP leverages the SP middle ware technology. DAP server ware translates DAP protocol to existing application specific protocols.

DAP and its subset DAML 1610 are designed to be lightweight and capable of supporting low-end bandwidth sensitive STBs. DAML tags are preferably no larger then 4 characters and when possible limited to 2 or 3 characters. DAML incorporates binary XML to facilitate DAML tags. DAP is used as a communication protocol between applications running on the STB and service sub-systems. DATP 1620 controls the communication handshaking, routing and transport specific authentication, where as DAML manages the application specific requirements. DAML requests and responses are communicated between a STB client and a service provider over an existing communication protocol, for example, TCP, UDP, DATP or a proprietary communications protocol.

The DAP protocol and its subset DAML can be a session oriented or "sessionless" protocol suite. DAML domains are application dependent. New domains of the DAP protocol can be used for new types of applications. The addition of new DAP domains have little effect on existing DAP domains. Thus, DAP provides a unique and simplistic SP for network operators to add additional services without impacting existing services. Each DAML domain can be based on either a simplistic human readable tag or a cryptic abbreviated tag for increasing protocol performance by decreasing the packet size when performance is a critical factor.

The following outlines the role of DAML in the DAP architecture. DAML is an application level communication protocol, utilized to specify communication behavior and communication data for interactive TV services. The service level communication protocol is above the transport level protocol. It defines how the application specific content is encapsulated between client/server communications.

DAML is a collection of domain specific protocols that enables a modular design of the SP. For example, DAML-Mail is a subset of DAP. DAML-Mail is a mail domain specific protocol. New domain-specific protocols can be added as a subset of DAP simply by creating new DTD's. DAP specifies communication behaviors through the sending and receiving of DAP messages. The application specific data is encapsulated in an XML format. The syntax of each XML application domain specifies the actions for the application servers to perform. This enables design of very lightweight simplistic protocols that today's STBs can utilize to interface with existing infrastructure such as SMTP services and IMAP services.

DATP is a transport/service level protocol that provides a communication platform between SGW and multiple STBs or clients. DAML is encapsulated in a DATP packet. In general service level protocols are above transportation protocols, but DATP is unique in that it can sit in a typical network model either at the service level, data link level or transport level. This makes DATP very flexible. DATP interfaces with the underlying transportation protocols, such as TCP, UDP, X.25, raw sockets, or other protocols.

SGW provides routing and SGW technology for low-end STBs to connect to a network backend infrastructure. SGW provides transport level protocol support between the STB/clients and SGW, for example, a sequential-stream protocol over raw sockets. DAML leverages this feature.

DAML-Mail is a protocol subset of DAP. DAML-Mail is a mail domain specific protocol. This protocol is used to link STBs with IMAP, POP3 and SMTP services. DAML-Regi is a DAP service domain protocol that specifies a generic method for the registration of accounts for multiple services. DAML-Regi is a simple protocol between a STB and the registration server. This enables complex interaction between an STB and a variety of different application systems, with only a single point of integration, the registration server.

DAML-Acct is a DAP service domain protocol that communicates with the SP VMS/AMS database. DAML-Acct enables the STB/client to query and return user specific data from the VMS/AMS system. All the DAML domains are defined using XML document type definition (DTD) syntax. DTDs describe the message syntax but not the logic for the exchanges of requests and responses. XML is useful in defining the markup of a block of text. Specific DAML requests and responses are interactions that are related to each other. The rules for their interaction are modularized in the STB and application server components.

The messaging manager provides various types of message communications among the users and with outsiders (those that are not network service subscribers). For example, it enables users to send and receive email, to chat with other non-subscribers and to receive instant messages from non-subscribers. The email portion of the mess aging manager contains a Fetchmail component connected to an Internet based email server such as IMAP, POP3 and other Webmail messages for the appropriate mail-hosting server.

Fetchmail manages all SP server-side mail management. Fetchmail translates DAP messages to IMAP, POP3 or Webmail messages for the appropriate mail hosting server. SGW routes DAP mail messages to "Fetchmail" for processing. Fetchmail responds with the appropriate response to the request. Fetchmail interfaces with IMAP servers. An email application is provided by the SP. All SP applications can 'send' email via the email service offered by SGW.

The chat SP service interfaces to a chat server or alternative includes a chat server. Chat service is accessible through a dedicated chat application, but also from any SP application linking with the SP chat client DLL. By providing an interface between a chat and a program listing, a chat room can be created dynamically with a broadcast show. Applications and other services can use the SP "alert" service to trigger STB resident mini-applications. Alert utilizes the SP OMM extension and functionality of Open Streamer. The Email service uses alert triggers to inform the viewer of an incoming message.

Figure 10:
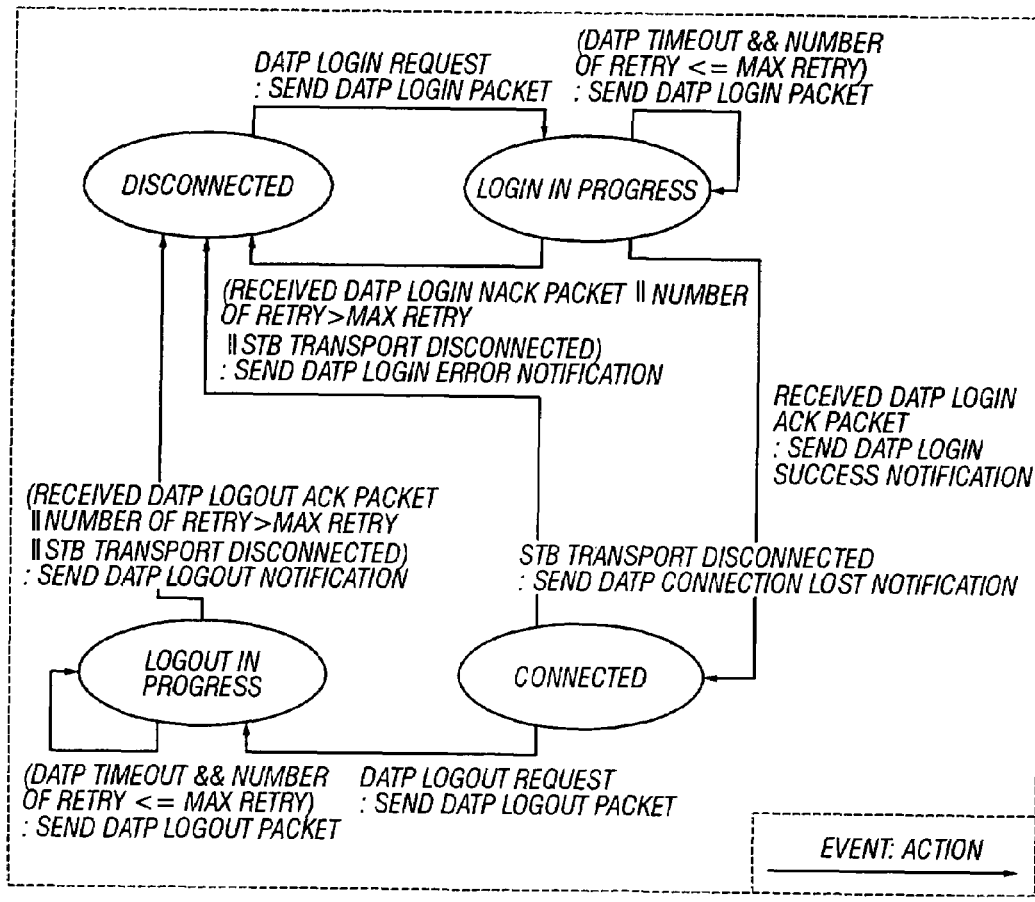
FIGS. 10-13 illustrate state machines for DATP.
Figure 11:
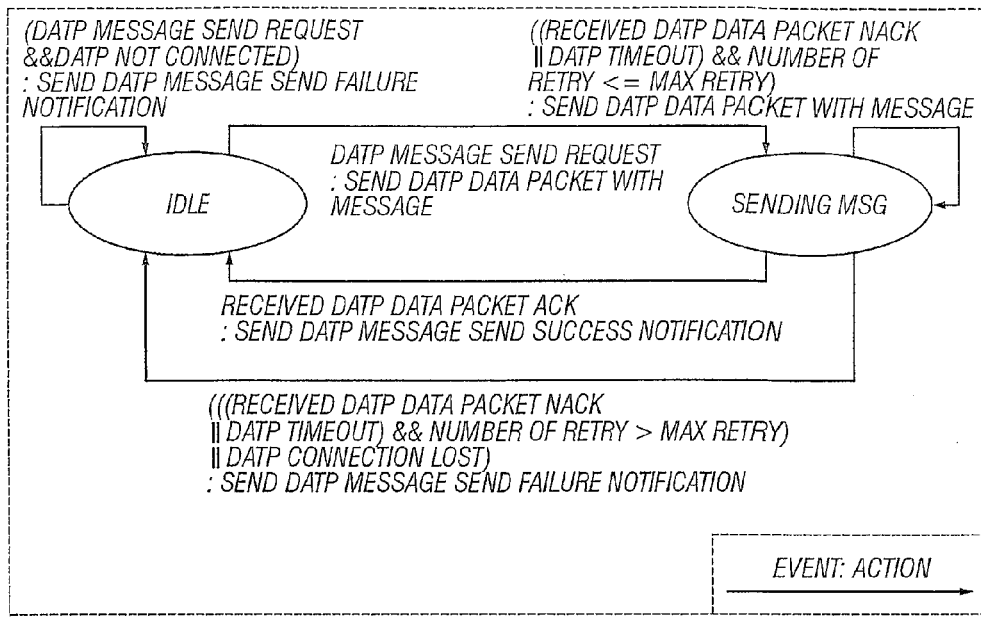
Figure 12:
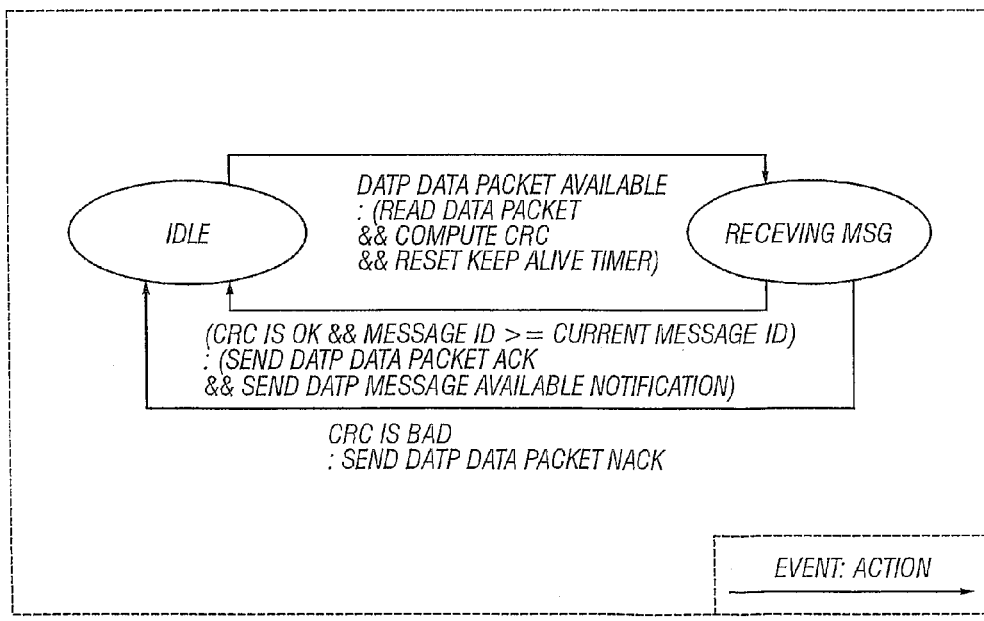
Figure 13:
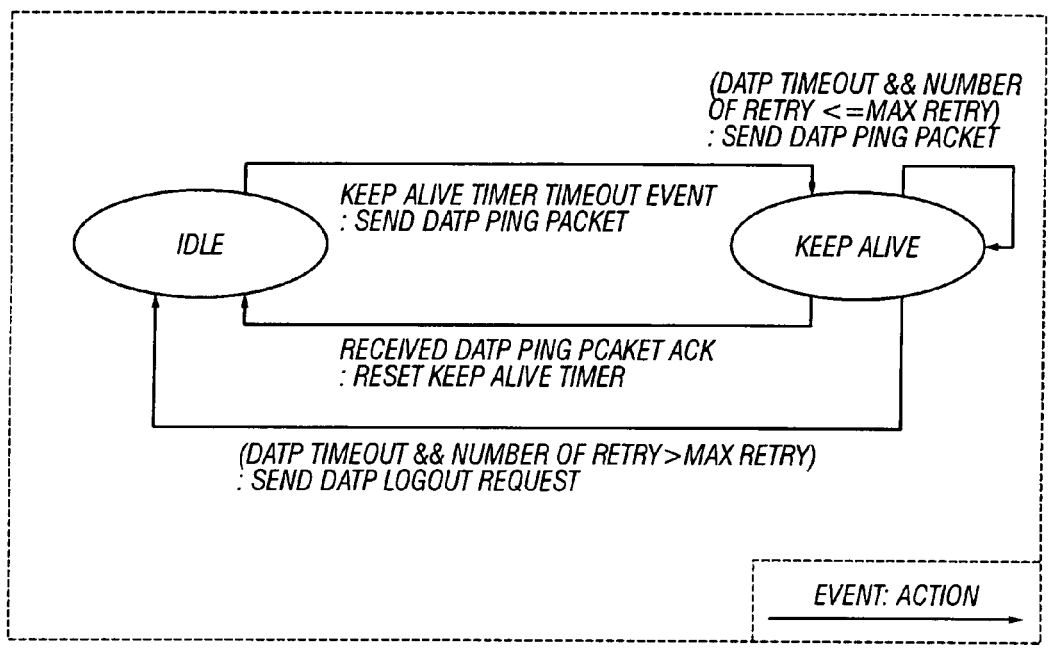

FIG. 10 describes the DATP connection state machine. This state machine describes the behavior of a DATP session connection state machine from the STB client side. A session must be in connected state before sending any data packet to the SGW and must be disconnected after a logout request from the client. FIG. 11 describes the message send state. This state machine describes how a DATP entity sends a DATP data packet to another DATP entity. FIG. 12 describes the message receive state machine. This state machine describes how a DATP entity receives a DATP data packet from another DATP entity. FIG. 13 describes the keep alive state machine. This state machine describes how a DATP entity should use ping packets to ensure that a DATP link to the other entity is still up. If it turns out that the link is down a logout is initiated.

SGW

Figure 5:
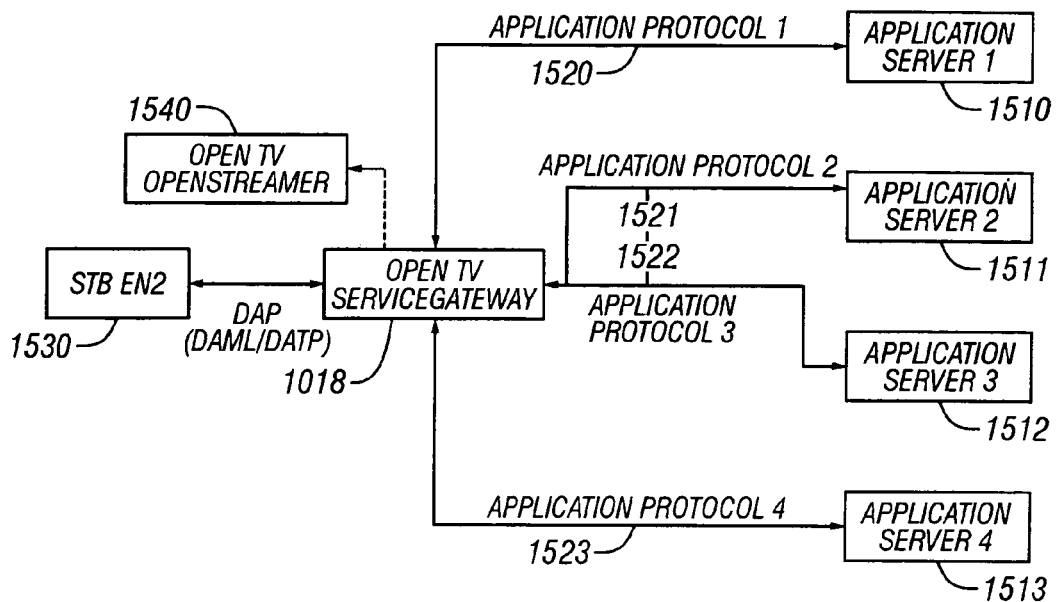
FIG. 5 illustrates the Service Gateway (SGW), Digital TV Application Transport Protocol (DATP) of the present invention as a subset of the Digital TV Application Protocol (DAP) used to standardize back channel communications between application servers and the SGW.

Turning now to FIG. 5, SGW incorporates a plurality of modules to support DATP features. The SGW architecture is a multi-process based architecture providing pools of threads. The entire server runs on an asynchronous version of a platform abstraction layer (PAL). The PAL implements a message queue process. PAL communicates using message passing techniques. SGW uses three types of processes, as shown in FIG. 5.

As shown in FIG. 5, application servers or services communicate with multiple clients/STBs through the SGW using a domain-specific DAP protocol. In certain cases, clients/STBs can directly connect to the application services. For example, if the transport protocol between the STB and the network is TCP/IP, the STB is TCP/IP enabled, and there is no requirement to perform complex common services provided by SGW, faster network performance can be improved via the client/STB communicating directly to a service via TCP/IP.

Figure 7:
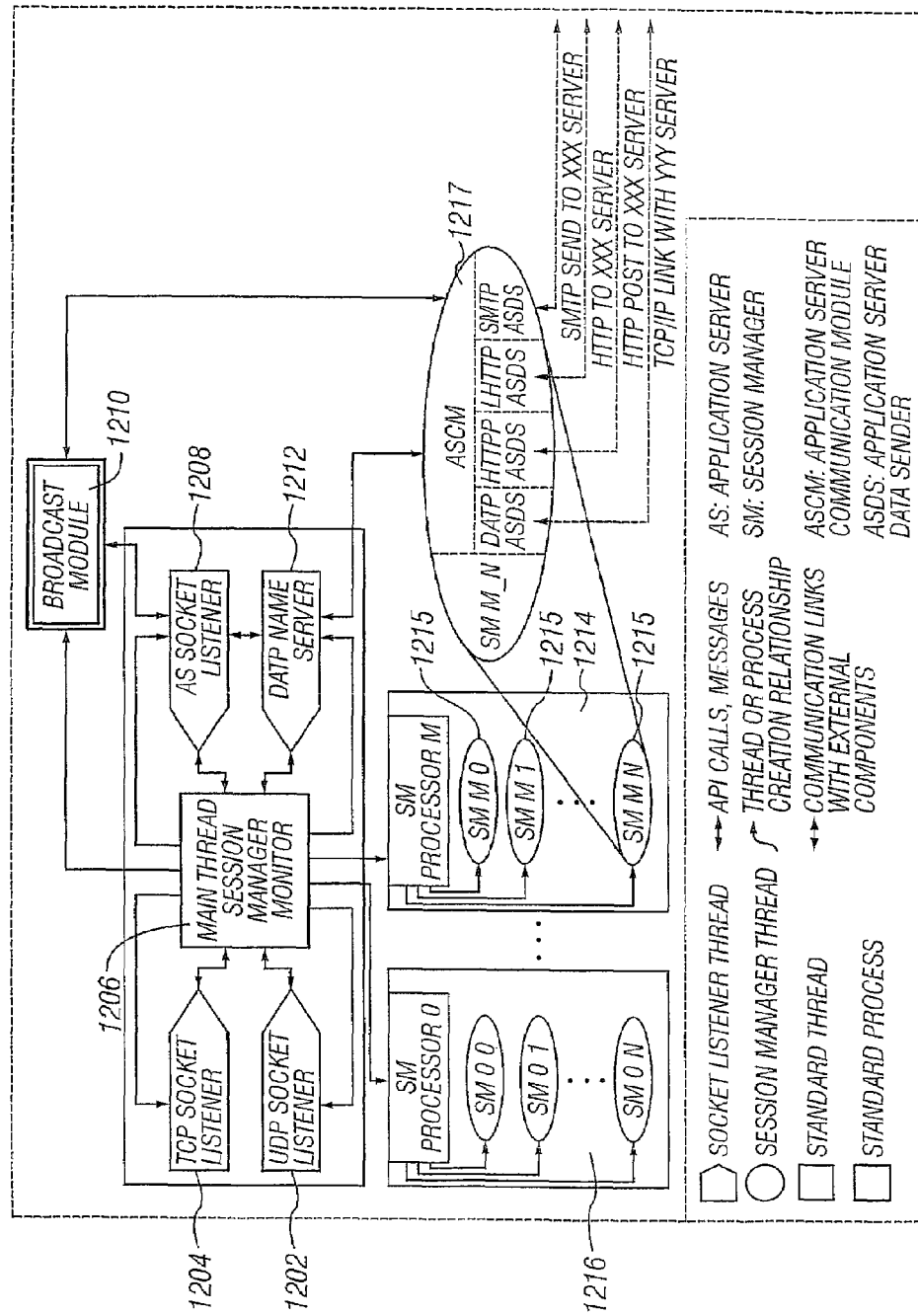
FIG. 7 illustrates an example of a preferred architecture for the SGW of the present invention.

Turning now to FIG. 7, the DATP Server, SGW main process is the main DATP server process described above. SGW hosts several key modules. The TCP socket listener module 1204 is a simple TCP socket listener thread that waits for connections on the DATP TCP listen port, accepts them and requests the creation of new session managers to handle new connections. The UDP socket listener 1202 waits on a well-known port for UDP connections. Once a connection request is received, the UDP socket listener 1202 creates a new socket and sends a connection request acknowledge to the remote host. UDP socket listener 1202 then requests the creation of a new session manager to handle the connection.

The session manager monitor 1206 module is part of the main thread. The primary role of this component is to monitor session manager (SM) processors 1214 population (creating and deleting SM Processors based on load), and to forward session manager creation requests to the least busy SM Processor 1215. Each SM processor (0–n) 1215 comprises a DATP application server communication module (ASCM) 1217 and a separate application server data sender (ASDS) for DATP, HTTPP, LHTTP and SMTP.

The DNS name server 1212 thread maintains a matching table between application server identifiers and their attributes (hostname, port, type, etc.) as well a matching table between session identifiers and session manager message queue identifiers. The name server module, DNS answers name resolve queries posted to its message queue. The application server socket listener thread 1208 is in charge of waiting for message post requests coming from application servers. The name server 1212 then forwards the post requests to the targeted session managers based on the post request session identifier.

The session manager processor process 1214, 1216 hosts a pool of session manager threads 1215. New session manager threads are created based on requests from the session manager monitor 1206 to the session manager processor thread. The session manager processor 1214, 1216 thread honors requests from the session manager processors 1214, 1216 and creates or deletes session managers based on requests from the SM monitor and notifies the session manager processor with the result of its requests. Session manager threads 1215 manage DATP sessions and forward DATP messages from STBs or clients to application servers and vice-versa. There will be one thread per STB or client. These threads utilize several key modules to handle DATP sessions (Packet library; Application Server Communication Module; DATP Application Server Data Sender; HTTPP Application Server Data Sender; LHTTP Application Server Data Sender; and SMTP Application Server Data Sender).

The broadcast manager process 1210 is the main component of DATP routing over broadcast. This process is an Openstreamer application server that manages DATP server carousels. Broadcast Manager Process updates these carousels dynamically depending on requests it receives from other components of the DATP Server.

The SP and SGW are preferably supported on Sun Solaris 7 data processing system with memory, monitor, GUI, mouse, keyboard and processor, which is well known in the art and available from Sun Microsystems. SGW runs as a UNIX daemon, is configured using a configuration file, and is started from the command line. Once a connection has been made between the SGW and the STB/client over a network, TCP/IP handles all communications between the other services. Besides handling different transport protocols, the SGW also routes messages to different service sub-systems depending on the configuration of SGW.

SGW performs its functions at the point of entrance to the application servers. This enables features to be easily configured and/or added since network and messaging functionality is isolated on SGW. This frees the service sub-systems to function on core application functionality and leaves network connectivity issues to SGW. This also enables greater scalability by isolating specific functionality to separate hosts: email message delivery and receiving (using the FetchMail server) from network routing and security using SGW.

SGW is sized to support hundreds of simultaneous connections on a single server. SGW is configurable to handle more connections depending upon the processing power of the processor hosting SGW. This limit is based on the number of modems (typically several hundred) per POP (Point of Presence) for major ISPs. In the case of a WAN architecture where the SGW is located at one central point, a hardware network address translation (NAT) based load balancing device is provided to connect several SGWs in parallel to distribute the load.

Content Translation—H2O

The following is an overview of the H2O Proxy environment using a logical view of H2O architecture and sample transactions. Requests for URI may come either from different H2O components—for example: STB/SGW and Carousel. The following context overview focuses on the STB/SGW issuing the requests—but the general flow of information stays the same.

A viewer chooses to interact with its TV Web page, thus issuing a request from the STB to the H2O system and waiting for a reply. STB requests are sent to the SGW, using lightweight HTTP requests (LHTTP) encapsulated in DATP messages as transport protocol. The requested object is returned through the same channel and protocol. The SGW converts the LHTTP protocol to standard HTTP over TCP/IP and issues the request to a Web Cache.

The Compiled Object Cache (COC) uses its internal disk space to service any request it can serve (following a heuristic taking into account the time-to live of objects). Its role is to service all static objects (standard URLs without queries, no posted form) without querying the H2O proxy, thus reducing it's processing load. In this architecture, the COC will only store compiled objects (H2O modules). The COC machine is I/O driven.

Figure 14:
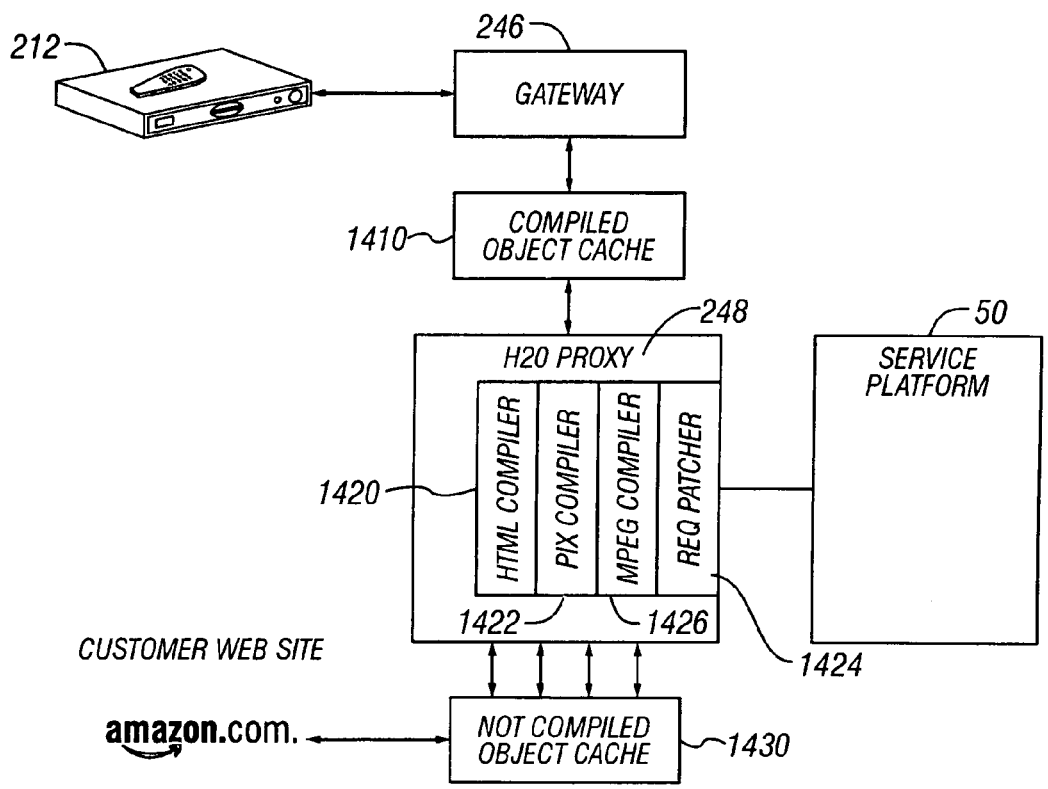
FIG. 14 illustrates an architecture for content translation, H2O.

Now turning to FIG. 14, H2O proxy 248 provides a scalable environment for the different H2O compilers (or filters) to run. It is processing HTTP request and responses "on the fly" and thus the H2O Proxy machine is process driven. The H2O HTML Compiler 1420 is in charge of HTML to SP resource compilation. To compute the TV Layout to render 1422, this component issues HTTP requests by itself based on the size of the embedded images. This compiler rearranges the Web based image to fit onto the client display device, e.g. a TV.

The MPEG Compiler 1426 charge of the conversion from regular web images format to SP H2O MPEG resources. Source format includes JPEG and GIF and may include PNG. Passing arguments through the URL may drive the conversion process. The PIXMAP Compiler is in charge of the conversion from regular web images to SP H2O resources. Source format comprises GIF and may include PNG.

The Request Patcher 1424 charge of completing or modifying the request or responses to incorporate data coming from another system (e.g. credit card number . . . ). It communicates with an external process or database to fetch customer information. The SP component provides a central repository of user information. The Request Patcher communicates with this component to get the data necessary to patch the requests/responses.

The Not Compiled Object Cache 1430 will use its internal disk space to service any request he can serve (following an heuristic taking into account the time-to live of objects). The objects cached comprise static HTML, GIF images, JPEG images and all standard web formats files. Its role is to service all static objects (standard URLs without queries, no posted form) without querying the Internet, thus reducing latency time to get an object and giving a kind of fault-tolerance to the system. The Customer web site holds the web site to publish through the H2O system.

Figure 15:
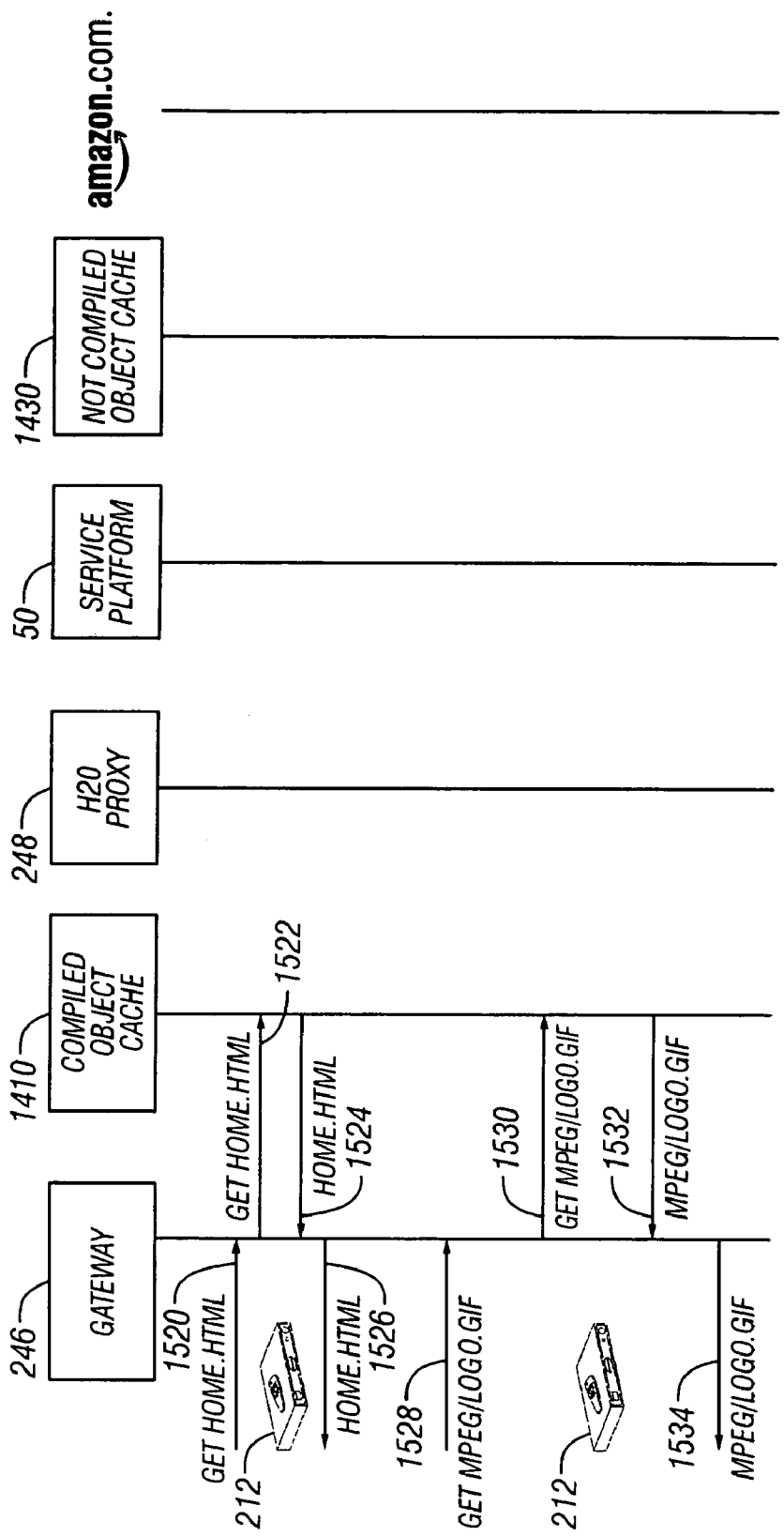
FIGS. 15-19 illustrate message scenarios between the client/STB, SGW, H2O and application service providers.

FIG. 15 illustrates a request for a static page, already cached. The STB user issues a request to load an HTML page 1520. This request is sent to the SGW 248 using LHTTP over DATP. The SGW converts the request to HTTP over TCP/IP and forwards it 1522 to the Compiled Object Cache 1410. The Compiled Object Cache 1410 has the requested (compiled to a module) HTML page stored in its internal hard disk space; if the object's time to live has not expired and the compiled object cache service the request with the compiled HTML page. It transmits the HTTP response 1424 to the SGW, using HTTP over TCP/IP. The SGW translates the protocol from HTTP over TCP/IP to LHTTP over DATP. The STB loads the requested page 1526 (compiled) in its memory and gives it to the H2O browser engine for interpretation. The H2O browser engine requests 1528 the SGW to get the images necessary to render the screen on TV, with conversion options (mpeg or pixmap, width, height . . . ) on the url. The SGW transmits the HTTP request 1530 to the Compiled Object Cache. The Compiled Object Cache has the requested (compiled to a module) image stored in its internal hard disk space; the objects time to live has not expired and the compiled object cache service 1532 and 1534 the request with the compiled image. In this scenario, the H2O Proxy was spared of the request and thus can process other requests.

Figure 16:
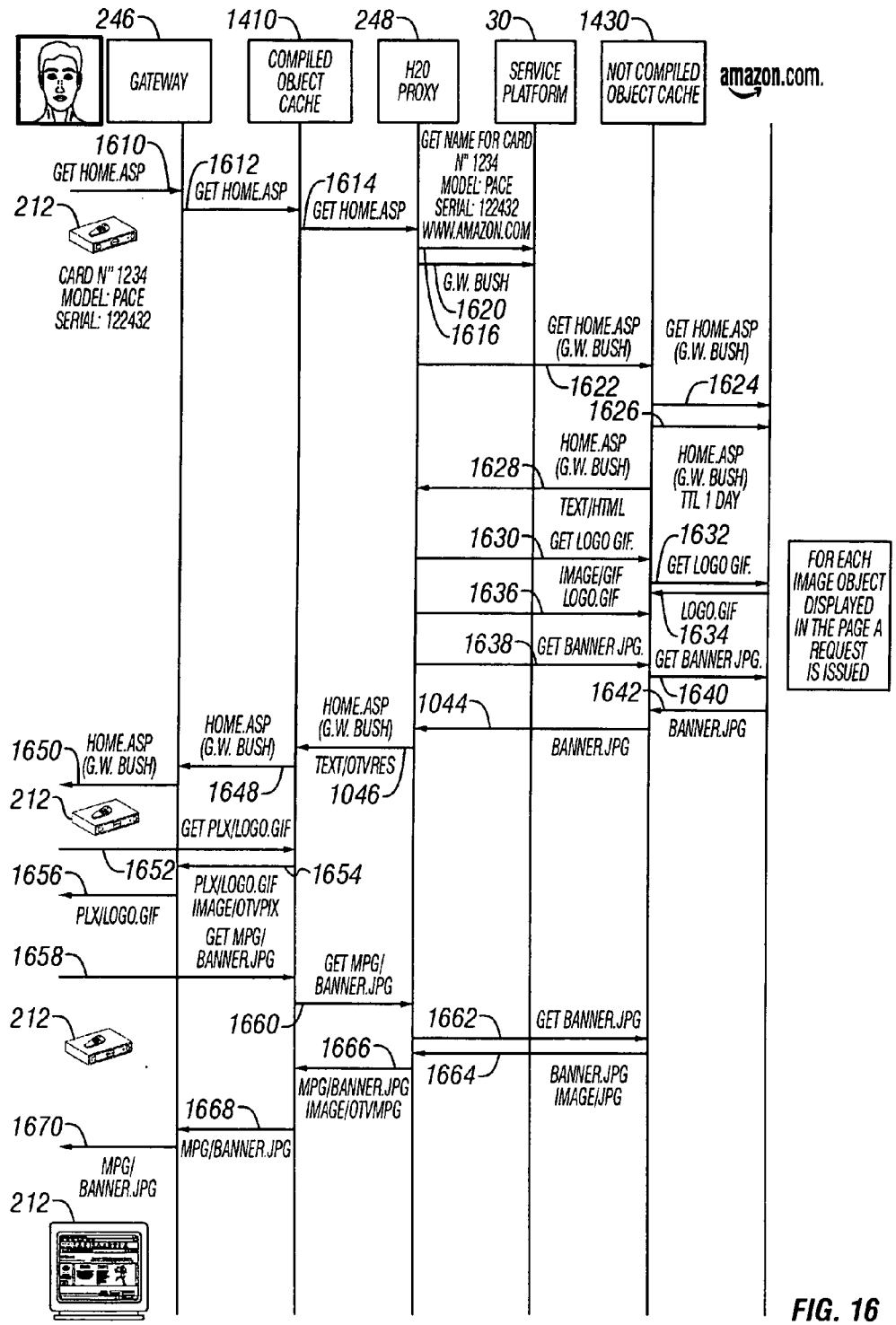

As shown in FIG. 16, the STB 212 user issues a request 1610 to load an HTML page (home.asp), the host and user info of the request header hold [STB Model+STB Serial number] and [Access Card Id] of the user. This request 1610 is sent to the SGW using LHTTP over DATP. The SGW converts the request to HTTP over TCP/IP and forwards it 1612 to the Compiled Object Cache. The requested object is not available in the disk space of the Web cache. The Web Cache then forwards the request 1614 to the H2O Proxy. The H2O Proxy asks 1616 the SP to return 1620 the name of the user (for the amazon.com service). The H2O Proxy patches the request with the name of the user, and issues this request 1622 to the "Not Compiled Object Cache". The "Not Compiled Object Cache" does not hold the requested HTML page in its disk space and then issues the request 1624 to the targeted web server here amazon.com. The targeted web server computes the HTML page, given the user information and returns 1626 it to the "Not Compiled Object Cache". The "Not Compiled Object Cache" returns the HTML page 1628 to the H2O Proxy.

The H2O Proxy sends the HTTP request 1630 to the "Not Compiled Object Cache" to get the images 1632, 1634, 1636 necessary for it's layout computations (gif, jpeg . . . ). The H2O Proxy compiles the HTML page; computes the layout, patches the embedded images urls and sends back to the "Compiled Object Cache" the resulting OpenTV resource 1646 (with an SP resource mime-type). The Compiled Object Cache stores the object in its internal disk space and sends back the compiled HTML 1648 page to the SGW. The SGW converts the response to LHTTP over DATP and sends it back to the 1650 STB. The STB loads the requested object in its memory and gives it to the H2O browser engine for interpretation.

The H2O browser engine issues requests 1652 to the SGW to get the images necessary for the rendering (through the patched urls: here the logo.gif url include a directive for pixmap resource format): pix/logo.gif. The SGW converts the request 1652 to HTTP over TCP/IP and forwards it to the Compiled Object Cache. The "Compiled Object Cache" already has the requested gif image, in the correct resource format—because a user already requested this image at a previous time—and the image is directly returned 1654 to the SGW. The SGW converts the response to LHTTP over DATP and sends it 1656 back to the STB. The H2O browser engine issues requests 1658 to the SGW to get the images necessary for the rendering: mpg/banner.jpg. The "Compiled Object Cache" does not hold the requested image in its disk space and therefore issues the request 1660 to the H2O Proxy. The H2O Proxy sends the HTTP request 1662 to the "Not Compiled Object Cache" to get the /banner.jpg image.

The "Not Compiled Object Cache" holds the image in its cache and returns it 1664 immediately to the H2O Proxy. The H2O Proxy converts the image, using the parameters given in the url (mpg format, width, height . . . ) and returns the result to the Compiled Object Cache 1668. The Compiled Object Cache stores the object in its internal disk space and sends back 1668 the converted mpeg image to the SGW. The SGW converts the response to LHTTP over DATP and sends it back 1670 to the STB. The STB renders the HTML page to screen.

The H2O Proxy component provides to other H2O components or compilers, A robust and scalable architecture and an interface for "compilers" configuration Other service provided is: the ability to log errors; the ability to alert an administrator on defined events; and the ability to debug-trace the "compilers". From the provided H2O Proxy environment and APIs the compilers "patch" HTTP requests and responses on the fly, eventually accessing an external database, file or process to do so. The compilers patch HTTP requests by removing specific HTTP Header (STB identifier, Access Card Identifier . . . ); by adding specific HTTP Header (Username, Credit Card Number . . . ); by adding HTML Form fields to incoming post request (Visa Card number . . . ); and by performing string substitution ($UID$->User Identifier) the compilers convert web objects formats and mime types "on the fly" in HTTP responses and issue HTTP requests by themselves and get a response object in return.

Figure 17:
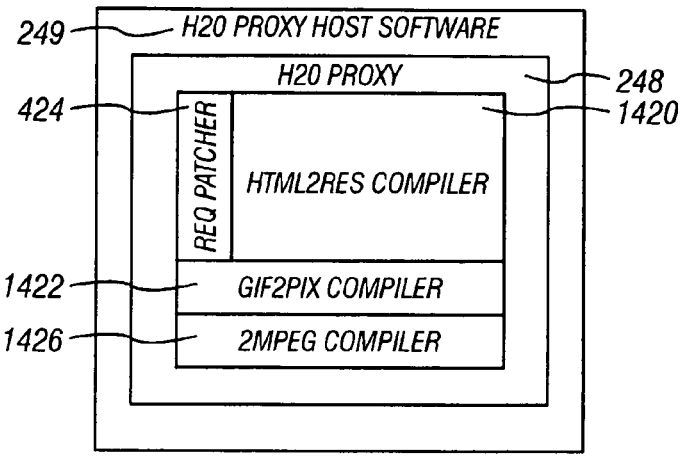

As shown in FIG. 17, in a preferred embodiment, the H2O Proxy is implemented by developing an extension of enclosing software (Web Proxy, Firewall, web server or other . . . ). This host software provides H2O threading and scheduling of the H2O tasks as well as some of the needed functionalities to implement H2O "compilers" and patching components.

Using the API provided by the Proxy Host Software, a set of API (the H2O Proxy API) is provided to implement the functionalities needed by the H2O compilers missing from the H2O Proxy Host Software Services, and provide a higher abstraction level for the services available from the H2O Proxy Host Software. The request patcher 1424 component reads incoming HTTP requests for HTML pages and completes them with information from another process or file or database. The HTML2RES Compiler 1420 compiles returned HTML pages into SP resources files and change the mime type of the HTTP response header to suit new format: Mime-Type: text/otvres.

The GIF2PIX Compiler 1422 converts a returned GIF image into an SP resource file and changes the mime type of the HTTP response header to suit new format: Mime-Type: image/otvpix. The 2MPEG Compiler 1426 converts a returned GIF or JPEG image into an SP resource file and change the mime-type of the HTTP response header to suit new format: Mime-Type: image/otvmpg.

Figure 18:
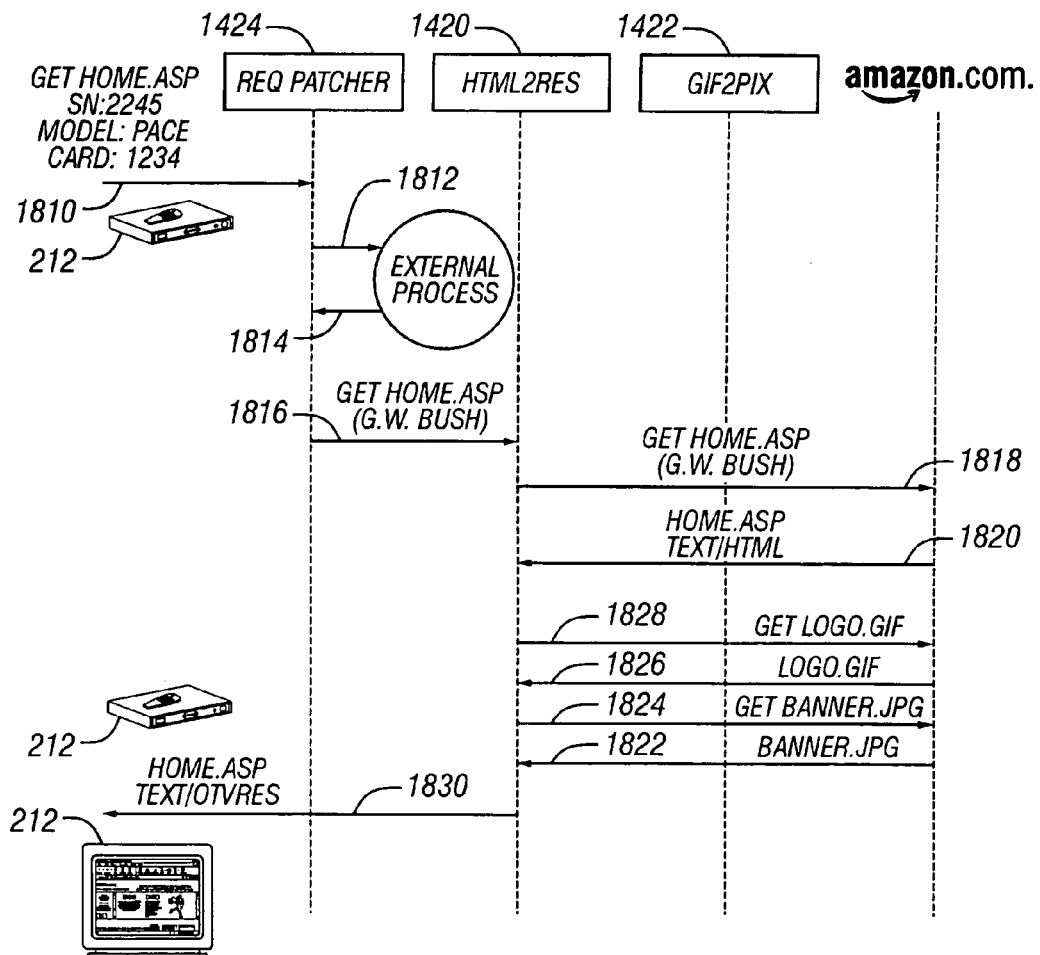

Turning now to FIG. 18, a dynamic request for an HTML page sequence diagram is illustrated. The Object Caches are not displayed in the Sequence diagram, being "passive" components in this interaction. The User STB 212 issues a request 1810 for a page (home.asp) through HTTP request. The Request Patcher 1424 accesses an external process/file/database/url 1812, 1814 to get user name, patches the request and sends 1816 it to the HTML2RES Compiler. The HTML2RES Compiler sends the request 1818 to the target web site (amazon.com). The Web site computes the request and sends back 1820 the resulting HTML page to the HTML2RES Compiler. The HTML2RES Compiler parses the file to get the image links URL and issue the requests 1822 to the web site to get 1824 the image files (logo.gif, banner.jpg). The HTML2RES Compiler computes the TV layout for the page, compiles it into SP resource file, and sends it 1830 back to the STB. The STB renders the HTML page on TV.

Figure 19:
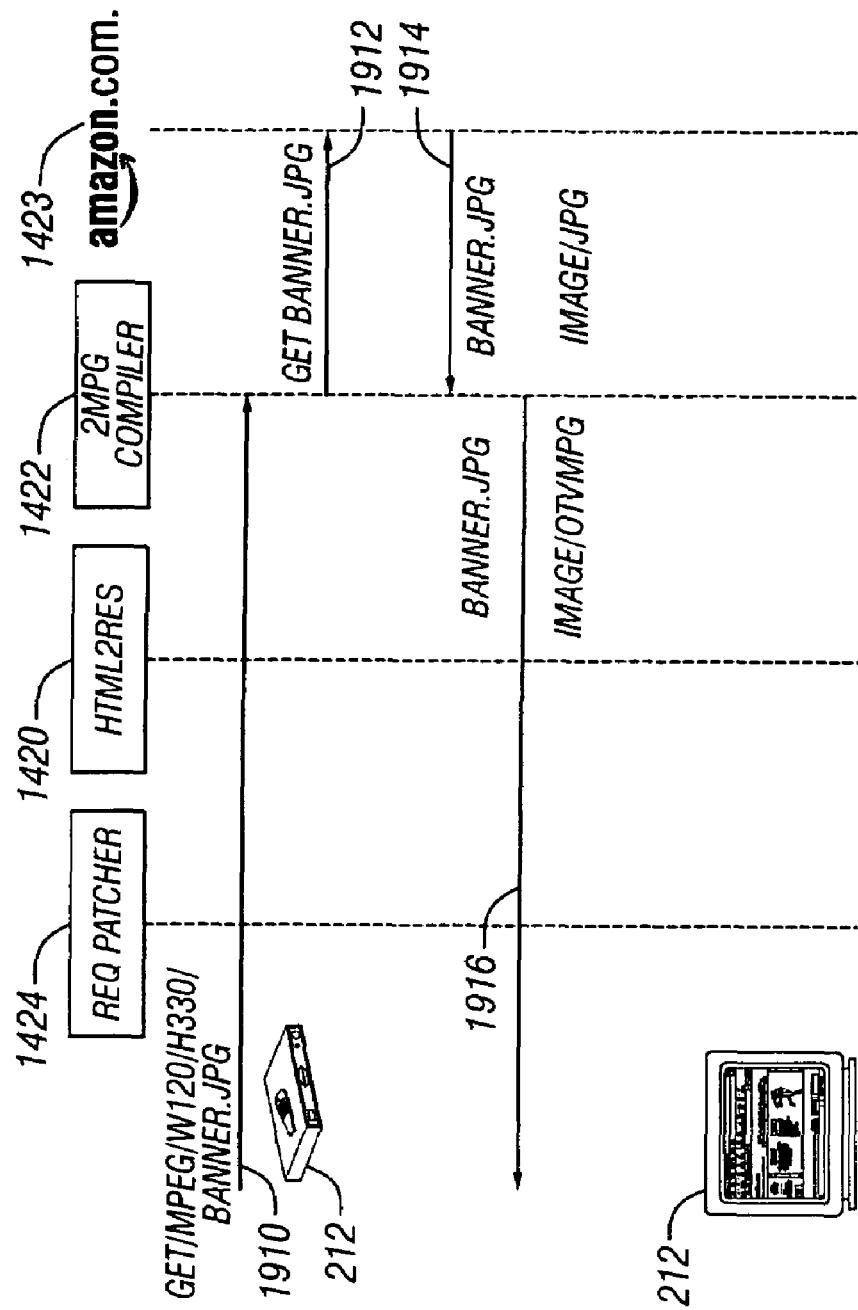

Turning now to FIG. 19, a request for an image file, sequence diagram is illustrated. An HTML page being loaded in the User STB needs an image to render its screen. It issues an HTTP request 1910 for the image (URL embedded conversion options) to the 2MPG Compiler. The 2MPG Compiler requests the image 1912 from the target site (amazon.com). The target site, returns the banner.jpg image file 1914 to the 2MPG Compiler. The 2MPG Compiler converts the banner.jpg file, using the options given on the URL and returns the result 1916, with an image/otvmpg mime-type, to the STB. The STB renders the image on screen.

The different identified H2O compilers inherit from the class H2O Compiler and provide an implementation for the different pure virtual entry points of the class. Memory functions are given to compilers to allocate and free the requests/responses buffers. The size of the allocated buffer is given to a FreeBuffer function so that different schemes can be used to free the buffer (for a certain size, the buffer might be implemented as a temporary file mapped in memory whereas for smaller sizes, it is preferably implemented as in memory buffer).

The buffer is passed to an Execute function containing the full HTTP request/response the compiler parses the request headers, mime-types and takes the appropriate actions. This buffer is preferably read-only. The buffer can be writeable as well to enable augmentation by the compiler or other functions after. The buffer returned by the Execute functions contains a valid HTTP request/response, the memory will be freed by the H2O proxy using the appropriate FreeBuffer function and has to be allocated by the provided AllocBuffer function. Debug member is provided for compiler implementers to be able to get a debug trace from within the H2O Proxy environment.

The parameters functions are used to get the names of the parameters, get the current values (string) of the parameters, set a new value for a parameter, and validate a parameter set. The URL functions are provided for the HTML compiler to fetch images. Those functions are available to the other compilers to provide extra services to the components whenever needed.

For example, a network with 1 Million STBs, with an average 20,000 users connected, generates 2,000 requests per second for HTML pages to the SGW and "Compiled Object Cache" (unless part of the requested pages come from broadband). Assuming all of those pages should be static and should be served immediately from the "Compiled Object cache", the H2O Proxy will have to serve 200 requests per second. Assuming that a typical HTML page embeds 10 images, 8 out of 10 being JPEG H2O Proxy issues 10 outgoing requests for each incoming request. The "Not Compiled Object cache" serves 2,000 requests per second.

The MPG conversion is preferably performed in advance whenever possible. A Web crawler may request the HTML pages and images at night to have them converted in advance, leveraging this issue. The compilers thus interact with H2O. H2O 248 is the preferred client/server solution provided in the SP that enables Internet content developers to create interactive TV content, applications and services for network operators running on the SP. Thus, via H2O enables the larger pool of Internet talent and content is made available to the vast growing worldwide market of interactive TV applications. The H2O server converts Internet content (HTML pages, ECMA scripts, and HTML page formatting) into SP assets. The H2O client, H2OC renders the assets and interacts with the clients. In the T-Commerce/E-Commerce case scenario, H2O enables E/T-Commerce shops to utilize existing Web tools to create shopping services and to interface with the preferred SP (operator), using standard Web protocols. Thus the present invention is user friendly providing APIs through known methodologies.

H2O acts as a proxy to the SGW and the broadcasting tools to convert Web content to SP content. Thus, Web sites developers can use their current HTTP servers and application servers to generate interactive TV content inexpensively. In a preferred embodiment, H2O converts HTML, JavaScript, and Internet graphics, however, any other known or developed Internet or other content or protocol can also be added to the proxy functionality of H2O. H2O enables the SP to display Web pages on STBs that are not fully browser capable and to create original user interfaces. H2O enables SP connection to any commerce engine that uses only HTML. H2O is responsible for converting all now or future broadband and Web content such as HTML pages, JPG pictures, wav audio files, etc. into SP resources.

The server side of H2O, H2OS is an HTTP proxy. For other purposes, it can be packaged as a dynamic link library (DLL) or batch tool. The client side of H2O, H2OC is an STB O-Code application. H2OC is built on top of other SP client components, such as the SGW library or the Carousel Load library. H2O enables URLs to be used to address documents and services. H2O also enables tracking in the broadcast and online environments. H2OS provides HTTP proxy functionality. SP applications request a document through H2O, upon which H2O retrieves the document, parses it, compiles it, and returns the document to the requester. This $H_2O$ functionality enables use of the same engine for different uses, online and broadcast, facilitates scalability, and enables flexible use of H2O. The parsing depends on the type of document, parsing can be HTML parsing, a GIF picture, or JPEG images, etc. To make it expandable, H2O is able to "plug-in" and run new third party filters.

H2O enables scripting using different languages. Preferably, all SP server components standardize around monitoring, especially the ability to remotely manage the different processes. SNMP is used to handle basic functions ("process OK", and traps on major problems). A command-line interpreter is provided on socket for inspecting status. Setting parameters enables remote management and provides an interface with the Web through Web scripts. In a preferred embodiment, standardized warnings and error logs are provided.

HTML/JS does not allow sharing of information from one page to another for the Web, as the server takes care of the context. In broadcast mode, this arrangement is insufficient. The present invention provides a broadcast mode, preferably, wherein a global permanent object is provided, that is not cleared when starting a new page. The permanent object maintains context between pages. Other base objects provided by the SP are also made permanent on transition (e.g., station control, OSD). Gadgets are defined through an interface definition language to enable creation of new gadgets, modification of gadgets and to enable adding methods without modifying the compiler.

The H2O Carousel feature provides real-time updating of catalogs, maintaining consistency of catalogs during updates, and providing safe transactional models. H2O carousel enables updating a single page, or an entire set of pages in a single transaction. Carousel management provides management of a carousel index or directory. The index contains information for accessing and fetching data from the carousel. That is, for a given page, Carousel Management contains a list of all modules necessary, so that H2OC requests all necessary modules at once to expedite the process.

Carousel provides data compression, Meta data on pages (e.g., page relative priority, how often the page is sent) and page tracking (elementary stream). The carousel client is a STB OCOD library, handling the loading of resources. Carousel client manages dynamics of resources, i.e., new resources, deleted resources, and changed resources. Dynamic resource management enables the client (H2OC) of this library to present dynamic content. The carousel client manages memory allocation, pre-fetching and caching of resources, and decompression of modules. The carousel client manages sub-index/directories and manages a 'set' of resources instead of a 'tree' of resources, which facilitates sharing of assets. Subsets of a single tree of resources can be assigned to separate processes thereby enabling shared resources.

H2O monitors TV triggers performance and bandwidth, e.g. shared resources in shared modules. H2O optimizes bandwidth utilization. H2O provides multi-tracks, multi-priorities, and management of bid volume of data. H2O provides run-time pre-fetching and caching at the module level. H2O supports compressed modules. H2O supports arrow and direct key navigation (e.g. digit or color), handling international (Chinese), Meta data on pages, (e.g., page relative priority, how often it is sent) and page tracking (elementary stream). Global GUI is shared, that is, a direct key linking is provided so that any information page can be shared by every other page.

H2O manages pages and sub-pages to handle cases where pages are too large to fit on one screen without the need for scrolling. H2O enables use of HTML to present content, online, point-to-point, and broadcast. H2O enables composition of a page with a mixture of broadcast and online components. For example, a page can come from an online server, while its background is broadcast. H2O enables merger of content in the STB. For example, a bank application can send a viewer's last 20 credit card transactions from its server while the HTML page is broadcast. Preferably a Java Script function request (HTTP like) the server some XML, using the result and some DOM functions patches a table with the result.

Preferably, security is provided for secured authentication of the viewer, which is performed at SGW rather than at H2O. However, H2O can alternatively comprise authentication functionality. H2O also sends encrypted data to (e.g., sending a credit card number) and from a STB to an online server. For some services, it is appropriate to go through a security proxy near the HTML to SP conversion. SP can utilize HTTPS from the proxy to the service provider, and an SSL like OCOD library from the STB to the proxy. In other cases (e.g., banks), security is provided from end to end, in which case H2O does not usually perform translation. That scenario is preferably reserved for data the STB is able to process without translation through H2O. Encryption can alternatively be performed at SGW or STB.

The present invention has been described in interactive television in a preferred embodiment, however, the present invention may also be embodied in a distributed computer system comprising a server and a client device. In another embodiment, the present invention is implemented as a set of instructions on a computer readable medium, comprising ROM, RAM, CD ROM, Flash or any other computer readable medium, now known or unknown that when executed by a distributed computer system cause a distributed computer system to implement the method of the present invention.

While a preferred embodiment of the invention has been shown by the above invention, it is for purposes of example only and not intended to limit the scope of the invention, which is defined by the following claims.

What is claimed is:

1. A method for providing communication in a distributed computer system comprising:
   providing a client compatible communication transport protocol on a client device, the transport protocol residing on at least one of the client device data link, network, transport and session layers of a network model, for sending a message from the client device and receiving a message at the client device, the message containing at least one of application code, control, data, and audio/visual data; and
   providing an application level communication protocol for transmission of a message between the client device and a server, the application level communication protocol running on top of the client compatible communication transport protocol;
   providing a data name service table for matching application server identifiers and application server attributes, the application server attributes comprising host name, port and type;

providing a matching table between a session identifier and session a message queue; and answering name queries posted to the session a message queue.

2. The method of claim 1, the method further comprising:
providing a communication interface in the client compatible transport protocol running on top of at least one of a native transport available on the client device and a data link available on the client device.

3. The method of claim 1, the method further comprising:
specifying in the application level communication protocol, communication behavior between the client and a service provider in communication with the server.

4. The method of claim 1, the method further comprising:
specifying, in the application level communication protocol, how application specific content is encapsulated in communications between the client and the server.

5. The method of claim 1, the method further comprising:
a plurality of domain specification protocols in the application level communication protocol that enables a modular design for a service platform, enabling addition of a domain specific protocol as a subset of the application level protocol by creating a new DTD for the added domain specific protocol.

6. The method of claim 1, the method further comprising:
specifying in a transport/service level protocol communication between the server and multiple client devices.

7. The method of claim 1, the method further comprising:
routing, via a server, of client device a message to a network backend infrastructure comprising a plurality of applications.

8. The method of claim 7, the method further comprising:
providing a transport level protocol between the client and the server.

9. The method of claim 1, the method further comprising:
providing client device access to a mail server.

10. The method of claim 1, the method further comprising:
registering multiple accounts for a plurality of services in a registration service in the application level communication protocol; and
enabling complex interaction between the client device and the plurality of services registered in the registration service, the registration service further comprising a single point of integration in the server.

11. The method of claim 1, the method further comprising:
providing client account query and return of data from the registration database.

12. The method of claim 1, the method further comprising:
providing a rule for request and response interaction between the client device and application, the rule modularized in the client device and the server.

13. The method of claim 1, the method further comprising:
providing a messaging manager for managing communication between a subscriber client and a non-subscriber client, the communication comprising email, chat and instant messages.

14. The method of claim 1, the method further comprising:
receiving a message at the client device from a head end from a service provider in communication with the head end.

15. The method of claim 14, the method further comprising:
displaying the communication from the service provider to a user at the client device.

16. The method of claim 15, the method further comprising:
completing an e-commerce transaction between the service provider and the client device user.

17. The method of claim 1, the method further comprising:
providing multiple pools of communication threads at the server for communication between the server and a plurality of client devices.

18. The method of claim 1, the method further comprising:
routing a message over a broadcast to the client device.

19. The method of claim 1, the method further comprising:
providing a client compatible communication transport protocol header, the header comprising a protocol version number, a protocol type, a STB actual export type, a message sequence number, a service identifier, a session identifier, an encryption flag, and a payload data size.

20. A method for providing communication in an interactive television system comprising:
providing a client compatible communication transport protocol on a client device, the transport protocol residing on at least one of the client device data link, network, transport and session layers of a network model, for sending a message from the client device and receiving a message at the client device, the a message containing at least one of application code, control, data, and audio/visual data; and
providing an application level communication protocol for transmission of a message between the client device and a server, the application level communication protocol running on top of the client compatible communication transport protocol;
providing a data name service table for matching application server identifiers and application server attributes, the application server attributes comprising host name, port and type;
providing a matching table between a session identifier and session a message queue; and
answering name queries posted to the session a message queue.

21. The method of claim 20, the method further comprising:
providing a communication interface in the client compatible transport protocol running on top of at least one of a native transport available on the client device and a data link available on the client device.

22. The method of claim 20, the method further comprising:
specifying in the application level communication protocol, communication behavior between the client and a service provider in communication with the server.

23. The method of claim 20, the method further comprising:
specifying, in the application level communication protocol, how application specific content is encapsulated in communications between the client and the server.

24. The method of claim 20, the method further comprising:
a plurality of domain specification protocols in the application level communication protocol that enables a modular design for a service platform, enabling addition of a domain specific protocol as a subset of the application level protocol by creating a new DTD for the added domain specific protocol.

25. The method of claim 20, the method further comprising:
specifying in a transport/service level protocol communication between the server and multiple client devices.

26. The method of claim 20, the method further comprising:
routing, via a server, of client device a message to a network backend infrastructure comprising a plurality of applications.

27. The method of claim 26, the method further comprising:
providing a transport level protocol between the client and the server.

28. The method of claim 20, the method further comprising:
providing client device access to a mail server.

29. The method of claim 20, the method further comprising:
registering multiple accounts for a plurality of services in a registration service in the application level communication protocol; and
enabling complex interaction between the client device and the plurality of services registered in the registration service, the registration service further comprising a single point of integration in the server.

30. The method of claim 20, the method further comprising:
providing client account query and return of data from the registration database.

31. The method of claim 20, the method further comprising:
providing a rule for request and response interaction between the client device and application, the rule modularized in the client device and the server.

32. The method of claim 20, the method further comprising:
providing a messaging manager for managing communication between a subscriber client and a non-subscriber client, the communication comprising email, chat and instant messages.

33. The method of claim 20, the method further comprising:
receiving a message at the client device from a head end from a service provider in communication with the head end.

34. The method of claim 33, the method further comprising:
displaying the communication from the service provider to a user at the client device.

35. The method of claim 34, the method further comprising:
completing an e-commerce transaction between the service provider and the client device user.

36. The method of claim 20, the method further comprising:
providing multiple pools of communication threads at the server for communication between the server and a plurality of client devices.

37. The method of claim 20, the method further comprising:
routing a message over a broadcast to the client device.

38. The method of claim 20, the method further comprising:
providing a client compatible communication transport protocol header, the header comprising a protocol version number, a protocol type, a STB actual export type, a message sequence number, a service identifier, a session identifier, an encryption flag, and a payload data size.

39. A computer readable medium containing instructions that when executed by a distributed computer system cause a distributed computer system to:
provide a client compatible communication transport protocol on a client device, the transport protocol residing on at least one of the client device data link, network, transport and session layers of a network model, for sending a message from the client device and receiving a message at the client device, the a message containing at least one of application code, control, data, and audio/visual data; and
provide an application level communication protocol for transmission of a message between the client device and a server, the application level communication protocol running on top of the client compatible communication transport protocol;
provide a data name service table for matching application server identifiers and application server attributes, the application server attributes comprising host name, port and type;
provide a matching table between a session identifier and session a message queue; and
answer name queries posted to the session a message queue.

40. The medium of claim 39, the medium further comprising instructions cause the distributed computer system to:
provide a communication interface in the client compatible transport protocol running on top of at least one of a native transport available on the client device and a data link available on the client device.

41. The medium of claim 39, the medium further comprising instructions cause the distributed computer system to:
specify in the application level communication protocol, communication behavior between the client and a service provider in communication with the server.

42. The medium of claim 39, the medium further comprising instructions cause the distributed computer system to:
specify, in the application level communication protocol, how application specific content is encapsulated in communications between the client and the server.

43. The medium of claim 39, the medium further comprising instructions cause the distributed computer system to:
provide a plurality of domain specification protocols in the application level communication protocol that enables a modular design for a service platform, enabling addition of a domain specific protocol as a subset of the application level protocol by creating a new DTD for the added domain specific protocol.

44. The medium of claim 39, the medium further comprising instructions cause the distributed computer system to:
specify in a transport/service level protocol communication between the server and multiple client devices.

45. The medium of claim 39, the medium further comprising instructions cause the distributed computer system to:
route, via a server, of client device a message to a network backend infrastructure comprising a plurality of applications.

46. The medium of claim 45, the medium further comprising instructions cause the distributed computer system to:
provide a transport level protocol between the client and the server.

47. The medium of claim 39, the medium further comprising instructions cause the distributed computer system to:
provide client device access to a mail server.

48. The medium of claim 39, the medium further comprising instructions cause the distributed computer system to:

register multiple accounts for a plurality of services in a registration service in the application level communication protocol; and enable complex interaction between the client device and the plurality of services registered in the registration service, the registration service further comprising a single point of integration in the server.

49. The medium of claim 39, the medium further comprising instructions cause the distributed computer system to:
provide client account query and return of data from the registration database.

50. The medium of claim 39, the medium further comprising instructions cause the distributed computer system to:
provide a rule for request and response interaction between the client device and application, the rule modularized in the client device and the server.

51. The medium of claim 39, the medium further comprising instructions cause the distributed computer system to:
provide a messaging manager for managing communication between a subscriber client and a non-subscriber client, the communication comprising email, chat and instant messages.

52. The medium of claim 39, the medium further comprising instructions cause the distributed computer system to:
receive a message at the client device from a head end from a service provider in communication with the head end.

53. The medium of claim 52, the medium further comprising instructions cause the distributed computer system to:
display the communication from the service provider to a user at the client device.

54. The medium of claim 53, the medium further comprising instructions cause the distributed computer system to:
complete an e-commerce transaction between the service provider and the client device user.

55. The medium of claim 39, the medium further comprising instructions cause the distributed computer system to:
provide multiple pools of communication threads at the server for communication between the server and a plurality of client devices.

56. The medium of claim 39, the medium further comprising instructions cause the distributed computer system to:
route a message over a broadcast to the client device.

57. The medium of claim 39, the medium further comprising instructions cause the distributed computer system to:
provide a client compatible communication transport protocol header, the header comprising a protocol version number, a protocol type, a STB actual export type, a message sequence number, a service identifier, a session identifier, an encryption flag, and a payload data size.

58. A set of application program interfaces embodied on a computer readable medium for execution on a computer in conjunction with an application program for communication in a distributed computing system comprising:
an application program interface for providing a client compatible communication transport protocol on a client device, the transport protocol residing on at least one of the client device data link, network, transport and session layers of a network model, for sending a message from the client device and receiving a message at the client device, the a message containing at least one of application code, control, data, and audio/visual data; and an application program interface for providing an application level communication protocol for transmission of a message between the client device and a server, the application level communication protocol running on top of the client compatible communication transport protocol;

an application program interface for providing a data name service table for matching application server identifiers and application server attributes, the application server attributes comprising host name, port and type;

providing a matching table between a session identifier and session a message queue; and answering name queries posted to the session a message queue.

59. The set of application program interfaces of claim 58, further comprising:
an application program interface for providing a communication interface in the client compatible transport protocol running on top of at least one of a native transport available on the client device and a data link available on the client device.

60. The set of application program interfaces of claim 58, further comprising:
an application program interface for specifying in the application level communication protocol, communication behavior between the client and a service provider in communication with the server.

61. The set of application program interfaces of claim 58, further comprising:
an application program interface for specifying, in the application level communication protocol, how application specific content is encapsulated in communications between the client and the server.

62. The set of application program interfaces of claim 58, further comprising:
an application program interface for a plurality of domain specification protocols in the application level communication protocol that enables a modular design for a service platform, enabling addition of a domain specific protocol as a subset of the application level protocol by creating a new DTD for the added domain specific protocol.

63. The set of application program interfaces of claim 58, further comprising:
an application program interface for specifying in a transport/service level protocol communication between the server and multiple client devices.

64. The set of application program interfaces of claim 58, further comprising:
an application program interface for routing, via a server, of client device a message to a network backend infrastructure comprising a plurality of applications.

65. The set of application program interfaces of claim 64, further comprising:
an application program interface for providing a transport level protocol between the client and the server.

66. The set of application program interfaces of claim 58, further comprising:
an application program interface for providing client device access to a mail server.

67. The set of application program interfaces of claim 58, further comprising:
an application program interface for registering multiple accounts for a plurality of services in a registration service in the application level communication protocol; and enabling complex interaction between the client device and the plurality of services registered in the registration service, the registration service further comprising a single point of integration in the server.

68. The set of application program interfaces of claim 58, further comprising:
an application program interface for providing client account query and return of data from the registration database.

69. The set of application program interfaces of claim 58, further comprising:
an application program interface for providing a rule for request and response interaction between the client device and application, the rule modularized in the client device and the server.

70. The set of application program interfaces of claim 58, further comprising:
an application program interface for providing a messaging manager for managing communication between a subscriber client and a non-subscriber client, the communication comprising email, chat and instant a messages.

71. The set of application program interfaces of claim 58, further comprising:
an application program interface for receiving a message at the client device from a head end from a service provider in communication with the head end.

72. The set of application program interfaces of claim 71, further comprising:
an application program interface for displaying the communication from the service provider to a user at the client device.

73. The set of application program interfaces of claim 72, further comprising:
an application program interface for completing an e-commerce transaction between the service provider and the client device user.

74. The set of application program interfaces of claim 58, further comprising:
an application program interface for providing multiple pools of communication threads at the server for communication between the server and a plurality of client devices.

75. The set of application program interfaces of claim 58, further comprising:
an application program interface for routing a message over a broadcast to the client device.

76. The set of application program interfaces of claim 58, further comprising:
an application program interface for providing a client compatible communication transport protocol header, the header comprising a protocol version number, a protocol type, a STB actual export type, a message sequence number, a service identifier, a session identifier, an encryption flag, and a payload data size.

77. An apparatus for providing communication in a distributed computer system comprising:
a computer program component for providing a client compatible communication transport protocol on a client device, the transport protocol residing on at least one of the client device data link, network, transport and session layers of a network model, for sending a message from the client device and receiving a message at the client device, the a message containing at least one of application code, control, data, and audio/visual data; and
a computer program component for providing an application level communication protocol for transmission of a message between the client device and a server, the application level communication protocol running on top of the client compatible communication transport protocol;
a computer program component for providing a data name service table for matching application server identifiers and application server attributes, the application server attributes comprising host name, port and type;
a computer program component for providing a matching table between a session identifier and session a message queue; and
answering name queries posted to the session a message queue.

78. The apparatus of claim 77, the method further comprising:
a computer program component for providing a communication interface in the client compatible transport protocol running on top of at least one of a native transport available on the client device and a data link available on the client device.

79. The apparatus of claim 77, the method further comprising:
a computer program component for specifying in the application level communication protocol, communication behavior between the client and a service provider in communication with the server.

80. The apparatus of claim 77, the method further comprising:
a computer program component for specifying, in the application level communication protocol, how application specific content is encapsulated in communications between the client and the server.

81. The apparatus of claim 77, the method further comprising:
a computer program component for providing a plurality of domain specification protocols in the application level communication protocol that enables a modular design for a service platform, enabling addition of a domain specific protocol as a subset of the application level protocol by creating a new DTD for the added domain specific protocol.

82. The apparatus of claim 77, the method further comprising:
a computer program component for specifying in a transport/service level protocol communication between the server and multiple client devices.

83. The apparatus of claim 77, the method further comprising:
a computer program component for routing, via a server, of client device a message to a network backend infrastructure comprising a plurality of applications.

84. The apparatus of claim 83, the method further comprising:
a computer program component for providing a transport level protocol between the client and the server.

85. The apparatus of claim 77, the method further comprising:
a computer program component for providing client device access to a mail server.

86. The apparatus of claim 77, the method further comprising:
a computer program component for registering multiple accounts for a plurality of services in a registration service in the application level communication protocol; and
a computer program component for enabling complex interaction between the client device and the plurality of services registered in the registration service, the registration service further comprising a single point of integration in the server.

87. The apparatus of claim 77, the apparatus further comprising:
   a computer program component for providing client account query and return of data from the registration database.

88. The apparatus of claim 77, the apparatus further comprising:
   a computer program component for providing a rule for request and response interaction between the client device and application, the rule modularized in the client device and the server.

89. The apparatus of claim 77, the apparatus further comprising:
   a computer program component for providing a messaging manager for managing communication between a subscriber client and a non-subscriber client, the communication comprising email, chat and instant messages.

90. The apparatus of claim 77, the apparatus further comprising:
   receiving a message at the client device from a head end from a service provider in communication with the head end.

91. The apparatus of claim 90, the apparatus further comprising:
   displaying the communication from the service provider to a user at the client device.

92. The apparatus of claim 91, the apparatus further comprising:
   completing an e-commerce transaction between the service provider and the client device user.

93. The apparatus of claim 77, the apparatus further comprising:
   a computer program component for providing multiple pools of communication threads at the server for communication between the server and a plurality of client devices.

94. The apparatus of claim 77, the apparatus further comprising:
   routing a message over a broadcast to the client device.

95. The apparatus of claim 77, the apparatus further comprising:
   a computer program component for providing a client compatible communication transport protocol header, the header comprising a protocol version number, a protocol type, a STB actual export type, a message sequence number, a service identifier, a session identifier, an encryption flag, and a payload data size.

96. An apparatus for providing communication in an interactive television system comprising:
   a computer program component for providing a client compatible communication transport protocol on a client device, the transport protocol residing on at least one of the client device data link, network, transport and session layers of a network model, for sending a message from the client device and receiving a message at the client device; and
   a computer program component for providing an application level communication protocol for transmission of a message between the client device and a server, the application level communication protocol running on top of the client compatible communication transport protocol;
   a computer program component for providing a data name service table for matching application server identifiers and application server attributes, the application server attributes comprising host name, port and type;
   a computer program component for providing a matching table between a session identifier and session a message queue; and answering name queries posted to the session a message queue.

97. The apparatus of claim 96, the method further comprising:
   a computer program component for providing a communication interface in the client compatible transport protocol running on top of at least one of a native transport available on the client device and a data link available on the client device.

98. The apparatus of claim 96, the method further comprising:
   a computer program component for specifying in the application level communication protocol, communication behavior between the client and a service provider in communication with the server.

99. The apparatus of claim 96, the method further comprising:
   a computer program component for specifying, in the application level communication protocol, how application specific content is encapsulated in communications between the client and the server.

100. The apparatus of claim 96, the method further comprising:
   a computer program component for providing a plurality of domain specification protocols in the application level communication protocol that enables a modular design for a service platform, enabling addition of a domain specific protocol as a subset of the application level protocol by creating a new DTD for the added domain specific protocol.

101. The apparatus of claim 96, the method further comprising: a computer program component for specifying in a transport/service level protocol communication between the server and multiple client devices.

102. The apparatus of claim 96, the method further comprising:
   a computer program component for routing, via a server, of client device a message to a network backend infrastructure comprising a plurality of applications.

103. The apparatus of claim 102, the method further comprising:
   a computer program component for providing a transport level protocol between the client and the server.

104. The apparatus of claim 96, the method further comprising:
   a computer program component for providing client device access to a mail server.

105. The apparatus of claim 96, the method further comprising:
   a computer program component for registering multiple accounts for a plurality of services in a registration service in the application level communication protocol; and
   a computer program component for enabling complex interaction between the client device and the plurality of services registered in the registration service, the registration service further comprising a single point of integration in the server.

106. The apparatus of claim 96, the apparatus further comprising:
   a computer program component for providing client account query and return of data from the registration database.

107. The apparatus of claim 96, the apparatus further comprising:
a computer program component for providing a rule for request and response interaction between the client device and application, the rule modularized in the client device and the server.

108. The apparatus of claim 96, the apparatus further comprising:
a computer program component for providing a messaging manager for managing communication between a subscriber client and a non-subscriber client, the communication comprising email, chat and instant messages.

109. The apparatus of claim 96, the apparatus further comprising:
receiving a message at the client device from a head end from a service provider in communication with the head end.

110. The apparatus of claim 109, the apparatus further comprising:
displaying the communication from the service provider to a user at the client device.

111. The apparatus of claim 110, the apparatus further comprising:
completing an e-commerce transaction between the service provider and the client device user.

112. The apparatus of claim 96, the apparatus further comprising:
a computer program component for providing multiple pools of communication threads at the server for communication between the server and a plurality of client devices.

113. The apparatus of claim 96, the apparatus further comprising:
routing a message over a broadcast to the client device.

114. The apparatus of claim 96, the apparatus further comprising:
a computer program component for providing a client compatible communication transport protocol header, the header comprising a protocol version number, a protocol type, a STB actual export type, a message sequence number, a service identifier, a session identifier, an encryption flag, and a payload data size.

115. A method for providing communication in a distributed computer system comprising:
providing a client compatible communication transport protocol on a client device, the transport protocol residing on at least one of the client device data link, network, transport and session layers of a network model, for sending a message from the client device and receiving a message at the client device, the message containing at least one of application code, control, data, and audio/visual data; and
providing an application level communication protocol for transmission of a message between the client device and a server, the application level communication protocol running on top of the client compatible communication transport protocol;
providing a client compatible communication transport protocol header, the header comprising a protocol version number, a protocol type, a STB actual export type, a message sequence number, a service identifier, a session identifier, an encryption flag, and a payload data size.

116. A method for providing communication in an interactive television system comprising:
providing a client compatible communication transport protocol on a client device, the transport protocol residing on at least one of the client device data link, network, transport and session layers of a network model, for sending a message from the client device and receiving a message at the client device, the a message containing at least one of application code, control, data, and audio/visual data; and
providing an application level communication protocol for transmission of a message between the client device and a server, the application level communication protocol running on top of the client compatible communication transport protocol;
providing a client compatible communication transport protocol header, the header comprising a protocol version number, a protocol type, a STB actual export type, a message sequence number, a service identifier, a session identifier, an encryption flag, and a payload data size.

117. A computer readable medium containing instructions that when executed by a distributed computer system cause a distributed computer system to:
provide a client compatible communication transport protocol on a client device, the transport protocol residing on at least one of the client device data link, network, transport and session layers of a network model, for sending a message from the client device and receiving a message at the client device, the a message containing at least one of application code, control, data, and audio/visual data; and
provide an application level communication protocol for transmission of a message between the client device and a server, the application level communication protocol running on top of the client compatible communication transport protocol;
provide a client compatible communication transport protocol header, the header comprising a protocol version number, a protocol type, a STB actual export type, a message sequence number, a service identifier, a session identifier, an encryption flag, and a payload data size.

118. A set of application program interfaces embodied on a computer readable medium for execution on a computer in conjunction with an application program for communication in a distributed computing system comprising:
an application program interface for providing a client compatible communication transport protocol on a client device, the transport protocol residing on at least one of the client device data link, network, transport and session layers of a network model, for sending a message from the client device and receiving a message at the client device, the a message containing at least one of application code, control, data, and audio/visual data;
an application program interface for providing an application level communication protocol for transmission of a message between the client device and a server, the application level communication protocol running on top of the client compatible communication transport protocol; and
an application program interface for providing a client compatible communication transport protocol header, the header comprising a protocol version number, a protocol type, a STB actual export type, a message sequence number, a service identifier, a session identifier, an encryption flag, and a payload data size.

119. An apparatus for providing communication in a distributed computer system comprising:
a computer program component for providing a client compatible communication transport protocol on a client device, the transport protocol residing on at least one of the client device data link, network, transport and session layers of a network model, for sending a message from the client device and receiving a message at the client device, the a message containing at least one of application code, control, data, and audio/visual data;

a computer program component for providing an application level communication protocol for transmission of a message between the client device and a server, the application level communication protocol running on top of the client compatible communication transport protocol; and a computer program component for providing a client compatible communication transport protocol header, the header comprising a protocol version number, a protocol type, a STB actual export type, a message sequence number, a service identifier, a session identifier, an encryption flag, and a payload data size.

120. An apparatus for providing communication in an interactive television system comprising:

a computer program component for providing a client compatible communication transport protocol on a client device, the transport protocol residing on at least one of the client device data link, network, transport and session layers of a network model, for sending a message from the client device and receiving a message at the client device;

a computer program component for providing an application level communication protocol for transmission of a message between the client device and a server, the application level communication protocol running on top of the client compatible communication transport protocol; and a computer program component for providing a client compatible communication transport protocol header, the header comprising a protocol version number, a protocol type, a STB actual export type, a message sequence number, a service identifier, a session identifier, an encryption flag, and a payload data size.

* * * * *

UNITED STATES PATENT AND TRADEMARK OFFICE
CERTIFICATE OF CORRECTION

PATENT NO. : 7,490,346 B2  Page 1 of 1
APPLICATION NO. : 10/061769
DATED : February 10, 2009
INVENTOR(S) : Alao et al.

It is certified that error appears in the above-identified patent and that said Letters Patent is hereby corrected as shown below:

In the Claims:

Claim 1, col. 31, line 2, please change "session a" to "a session".

Claim 1, col. 31, line 4, please delete "a" after "the session".

Claim 20, col. 32, line 37, please change "session a" to "a session".

Claim 20, col. 32, line 38, please delete "a" after "the session".

Claim 39, col. 34, line 22, please change "session a" to "a session".

Claim 39, col. 34, line 23, please delete "a" after "the session".

Claim 58, col. 36, line 9, please change "session a" to "a session".

Claim 58, col. 36, line 10, please delete "a" after "the session".

Claim 77, col. 38, line 9, please change "session a" to "a session".

Claim 77, col. 38, line 11, please delete "a" after "the session".

Claim 96, col. 40, line 4, please change "session a" to "a session".

Claim 96, col. 40, line 6, please delete "a" after "the session".

Signed and Sealed this

Fourteenth Day of July, 2009

JOHN DOLL
*Acting Director of the United States Patent and Trademark Office*